United States Patent
Wang et al.

(10) Patent No.: US 11,849,016 B1
(45) Date of Patent: Dec. 19, 2023

(54) TIME SYNCHRONIZATION USING MODEL CORRECTION

(71) Applicant: Equinix, Inc., Redwood City, CA (US)

(72) Inventors: Lanfa Wang, Sunnyvale, CA (US); Danjue Li, Dublin, CA (US); Mustafa Arisoylu, San Jose, CA (US)

(73) Assignee: Equinix, Inc., Redwood City, CA (US)

( * ) Notice: Subject to any disclaimer, the term of this patent is extended or adjusted under 35 U.S.C. 154(b) by 14 days.

(21) Appl. No.: 17/302,824

(22) Filed: May 13, 2021

(51) Int. Cl.
*H04L 7/00* (2006.01)

(52) U.S. Cl.
CPC .................................. *H04L 7/0037* (2013.01)

(58) Field of Classification Search
None
See application file for complete search history.

(56) References Cited

U.S. PATENT DOCUMENTS

| | | | |
|---|---|---|---|
| 7,484,196 B2 * | 1/2009 | Ja | G06F 30/3312 716/108 |
| 8,959,381 B2 | 2/2015 | Aweya et al. | |
| 9,531,395 B2 * | 12/2016 | Aweya | H03L 7/1976 |
| 9,673,970 B1 * | 6/2017 | Aweya | H04L 43/106 |
| 10,404,393 B2 | 9/2019 | Ha et al. | |
| 11,063,738 B1 | 7/2021 | Wang | |
| 2015/0163000 A1 * | 6/2015 | Aweya | H04J 3/0667 370/503 |
| 2020/0076439 A1 * | 3/2020 | Weeks | H03L 7/0805 |

FOREIGN PATENT DOCUMENTS

WO 2015049478 A1 4/2015

OTHER PUBLICATIONS

Mills et al., "Network Time Protocol Version 4: Protocol and Algorithms Specification," RFC 5905, Internet Engineering Task Force (IETF), Jun. 2010, 110 pp.
Shankarkumar et al., "Precision Time Protocol Version 2 (PTPv2) Management Information Base," Internet Engineering Task Force (IETF), RFC 8173, Jun. 2017, 64 pp.
U.S. Appl. No. 16/438,310, filed Jun. 11, 2019, by Ozarkar et al.
(Continued)

*Primary Examiner* — Gerald A Smarth
(74) *Attorney, Agent, or Firm* — Shumaker & Sieffert, P.A.

(57) ABSTRACT

Techniques are disclosed for performing time synchronization at a plurality of computing devices in a network. In one example, a method comprising obtaining timestamp data in accordance with a synchronization operation for a timing protocol; computing a skewness estimate and an offset estimate from the timestamp data by executing a regression analysis, wherein the regression analysis is configured to train a first model to predict the offset estimate and the skewness estimate, the offset estimate comprising a clock time difference between the first clock and the second clock; computing a corrected skewness estimate and a corrected offset estimate based on a second model having parameters based on the offset estimate and the skewness estimate; and modifying a current time value of at least one of the first clock or the second clock based on at least one of the corrected offset estimate or the corrected skewness estimate.

20 Claims, 9 Drawing Sheets

(56) References Cited

OTHER PUBLICATIONS

Mills, "Internet Time Synchronization: the Network Time Protocol," IEEE Transactions on Communications, vol. 39, No. 10, Oct. 1991, pp. 1482-1493.

IEEE Standard for a Precision Clock Synchronization Protocol for Networked Measurement and Control Systems, IEEE Standard 1588, Jul. 2008, 289 pp.

Lee et al., "An Accuracy Enhanced IEEE 1588 Synchronization Protocol for Dynamically Changing And Asymmetric Wireless Links," IEEE Communications Letters, vol. 16, No. 2, Feb. 2012, pp. 190-192.

Wang et al., "A Nonlinear Model for Time Synchronization," 2019 Workshop on Synchronization and Timing Services, Mar. 2019, 7 pages.

Chongning NA et al., "A Kalman Filter Approach to Clock Synchronization of Cascaded Network Elements," Proceedings of the First IFAC Workshop on Estimation and Control of Networked Systems Sep. 24-26, 2009, pp. 54-59.

Auler et al., "Adaptive Kalman Filter for Time Synchronization Over Packet-Switched Networks," 2007 2nd International Conference on Communication Systems Software and Middleware, Jan. 7-12, 2007, 7 pp.

Giorgi et al.. "Performance Analysis of Kalman Filter-Based Clock Synchronization in IEEE 1588 Networks," ISPCS 2009 International IEEE Symposium on Precision Clock Synchronization for Measurement, Control and Communication, Oct. 12-16, 2009, 6 pp.

Giorgi et al., "An Event-Based Kalman Filter for Clock Synchronization," IEEE Transactions on Instrumentation and Measurement, Feb. 2015, 9 pp.

Mohamed et al., "Adaptive Kalman Filtering for INS/GPS," Journal of Geodesy vol. 73, No. 4, May 1999, pp. 193-203.

Rizo et al., "Cauchy Distribution for Jitter in IP Networks," 18th International Conference on Electronics, Communications and Computers, Apr. 2008, pp. 35-40.

Psiaki et al., "GNSS Spoofing Detection Using High-Frequency Antenna Motion and Carrier-Phase Data," Proceedings of the 26th International Technical Meeting of the Satellite Division of The Institute of Navigation (ION), Sep. 16-20, 2013, pp. 2949-2991.

Psiaki et al., "GNSS Spoofing Detection using Two-Antenna Differential Carrier Phase," 27th International Technical Meeting of the Satellite Division of the Institute of Navigation, Jan. 2014, 25 pp.

Wang et al., "GNSS Spoofing Countermeasure With a Single Rotating Antenna." IEEE Access, vol. 5, Apr. 26, 2017, pp. 8039-8047.

Han et al., "A Novel Anti-Spoofing Method Based on Particle Filter for GNSS," 2014 IEEE International Conference on Communications (ICC), Jun. 10-14, 2014, 6 pp.

Gao et al., "Protecting GNSS Receivers From Jamming and Interference," Proceedings of the IEEE, vol. 104, No. 6, Jun. 2016, pp. 1327-1338.

Yang et al., "Environment-Aware Clock Skew Estimation and Synchronization for Wireless Sensor Networks," 2012 Proceedings IEEE Infocom, Mar. 25-30, 2012, 10 pp.

Maybeck, "Chapter Six: Design and Performance Analysis of Kalman Filters," Stochastic Models, Estimation, and Control, vol. 141 of Mathematics in Science and Engineering, Academic Press, 1979 (Applicant points out, in accordance with MPEP 609.04(a), that the year of publication, 1979, is sufficiently earlier than the effective U.S. filing date, so that the particular month of publication is not in issue.), pp. 289-367.

U.S. Appl. No. 17/127,565, filed Dec. 18, 2020, by Wang et al.

\* cited by examiner

TIME SYNCHRONIZATION USING MODEL CORRECTION

TECHNICAL FIELD

This disclosure generally relates to time synchronization for computing systems.

BACKGROUND

A synchronization system, in general, synchronizes clocks of multiple devices based on the clock of a chosen master device (also referred to as a "primary" device or a "leader" device). The master device is a computing device that gets time synchronization data from other master devices or intelligent engines deployed either inside or outside of the synchronization system, such as a global positioning system (GPS). The master device maintains accurate clock information for other computing devices, which may be known as "slave" devices.

Time synchronization is the process of coordinating otherwise independent clocks, such as the clocks of computing devices connected to each other on a network. Even when initially set accurately, real clocks will exhibit clock drift and differ after some amount of time due to the fact that even the most accurate clocks count time at slightly different rates. Time synchronization may be part of a timing protocol, such as IEEE 1588 Precision Time Protocol (PTP) and Network Time Protocol (NTP), in operation on the network for correcting differences between the clock of the chosen master device and the clock of a slave device. In network computing and distributed computing environments, each computing device must realize the same global time. Computing devices that are not accurately synchronized may treat the same event as happening in the past, concurrently, or in the future, thereby exhibit unpredictable and unreliable behavior. This is increasingly important in high-speed networking because there may be numerous inter-connected systems that depend on extremely precise timing to function correctly.

In many applications, including but not limited to financial, scientific, military, programmatic advertising, and gaming industries, time synchronization may be beneficial. For instance, such knowledge would be used to define trade orders in high-frequency trading systems and gamers response in multi-user games.

SUMMARY

In general, this disclosure describes techniques for performing time synchronization, using model correction, for a plurality of computing devices that are interconnected to each other in a network. Technology implementing at least some of these techniques includes at least one hardware/software component, such as processing circuitry executing programmable logic (e.g., in form of processor-executable instructions or code). A timing protocol, operative on the plurality of computing devices in the network, may leverage this technology to enable efficient data communications between these computing devices. In one example, the timing protocol enables such efficient data communications by applying accurate clock corrections at one or more of the computing devices in the network.

As described herein, an accurate clock time correction may synchronize at least two clocks (e.g., to a correct reference time), mitigating effects from network delays and clock drift. Certain time synchronization techniques make a number of assumptions that may render any clock correction faulty and inaccurate, especially in response to a non-trivial network induced delay (e.g., queuing delay). These techniques may rely upon a traditional regression analysis of a given dataset to estimate skewness and offset parameters without ensuring that these estimates are accurate before relying upon them for time synchronization at one or more computing devices.

The techniques of the disclosure provide one or more specific technical improvements in computer networks. As described herein, timing protocols for such computer networks require accuracy when measuring delays between computing devices, especially a server having a master clock and another server operating as a slave, in order to perform precise time synchronization. Clock correction, in general, refers to correcting a clock offset at one or more computing devices in a network. Having an accurate clock offset enables efficient and less faulty data communications between the computing devices of the network. Hence, the techniques of the disclosure allow for accounting of synchronization between clocks of a plurality of computing devices on a network. Some techniques may leverage the Kalman filter to enable anomaly detection for any timestamp dataset and in some instances, may reset the skewness and offset estimates as a response to a detected anomaly. By doing so, these techniques help a computing device conserve its resource capacities including processing power and memory space by reducing processor and memory usage.

As described herein, methods, systems, and devices are disclosed for performing time synchronization for a plurality of computing devices on a network having paths between the plurality of computing devices. In one example, a computing device obtains time-stamp data the indicates trip time for packets between a first computing device and a second computing device, computes a skewness estimate and an offset estimate from the timestamp data by executing, over a number of iterations, a weighted regression analysis, the skewness estimate comprising a frequency difference between a first clock at the first computing device and a second clock at the second computing device, and corrects the first clock at the computing device in accordance with the synchronization operation for the timing protocol. As an example, the techniques may include applying, based on the value for the offset estimate, a time correction that adds/subtracts an amount of time to/from the first clock at the computing device. During the time correction, the actual amount of time being added to or subtracted from a current time of the first clock may or may not be equal to the offset estimate.

In one example, this disclosure describes a method for time synchronization for a plurality of clocks on a network, comprising: obtaining, by processing circuitry of a first computing device in a network having a network topology of computing devices, timestamp data in accordance with a synchronization operation for a timing protocol, wherein the timestamp data describes one or more measured delays for a path between the first computing device and a second computing device of the network; computing, by the processing circuitry, a skewness estimate and an offset estimate from the timestamp data by executing a regression analysis, wherein the regression analysis is configured to train a first model to predict the offset estimate and the skewness estimate, the skewness estimate comprising a frequency difference between a first clock at the first computing device and a second clock at the second computing device, the offset estimate comprising a clock time difference between the first clock and the second clock; computing, by the processing circuitry, a corrected skewness estimate and a corrected offset estimate based on a second model having parameters based on the offset estimate and the skewness estimate; and modifying, by the processing circuitry, a current time value of at least one of the first clock or the second clock based on at least one of the corrected offset estimate or the corrected skewness estimate.

In one example, this disclosure describes a network device for time synchronization for a plurality of clocks on a network having a network topology of computing devices. The network device comprises computer memory and processing circuitry coupled to the computer memory and configured to provide time synchronization for a plurality of clocks on a network, the processing circuitry operative to: obtain timestamp data in accordance with a synchronization operation for a timing protocol, wherein the timestamp data describes one or more measured delays for a path between the first computing device and a second computing device of the network; compute a skewness estimate and an offset estimate from the timestamp data by executing a regression analysis, wherein the regression analysis is configured to train a first model to predict the offset estimate and the skewness estimate, the skewness estimate comprising a frequency difference between a first clock at the first computing device and a second clock at the second computing device, the offset estimate comprising a clock time difference between the first clock and the second clock; compute a corrected skewness estimate and a corrected offset estimate based on a second model having parameters based on the offset estimate and the skewness estimate; and modify a current value of the at least one of the first clock or the second clock based on at least one of the corrected offset estimate or the corrected skewness estimate.

In another example, this disclosure describes a non-transitory computer-readable medium comprising executable instructions, that when executed by processing circuitry, cause a computing device to: obtain timestamp data in accordance with a synchronization operation for a timing protocol, wherein the timestamp data describes one or more measured delays for a path between the first computing device and a second computing device of the network; compute a skewness estimate and an offset estimate from the timestamp data by executing a regression analysis, wherein the regression analysis is configured to train a first model to predict the offset estimate and the skewness estimate, the skewness estimate comprising a frequency difference between a first clock at the first computing device and a second clock at the second computing device, the offset estimate comprising a clock time difference between the first clock and the second clock; compute a corrected skewness estimate and a corrected offset estimate based on a second model having parameters based on the offset estimate and the skewness estimate; and modify a current value of the at least one of the first clock or the second clock based on at least one of the corrected offset estimate or the corrected skewness estimate.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
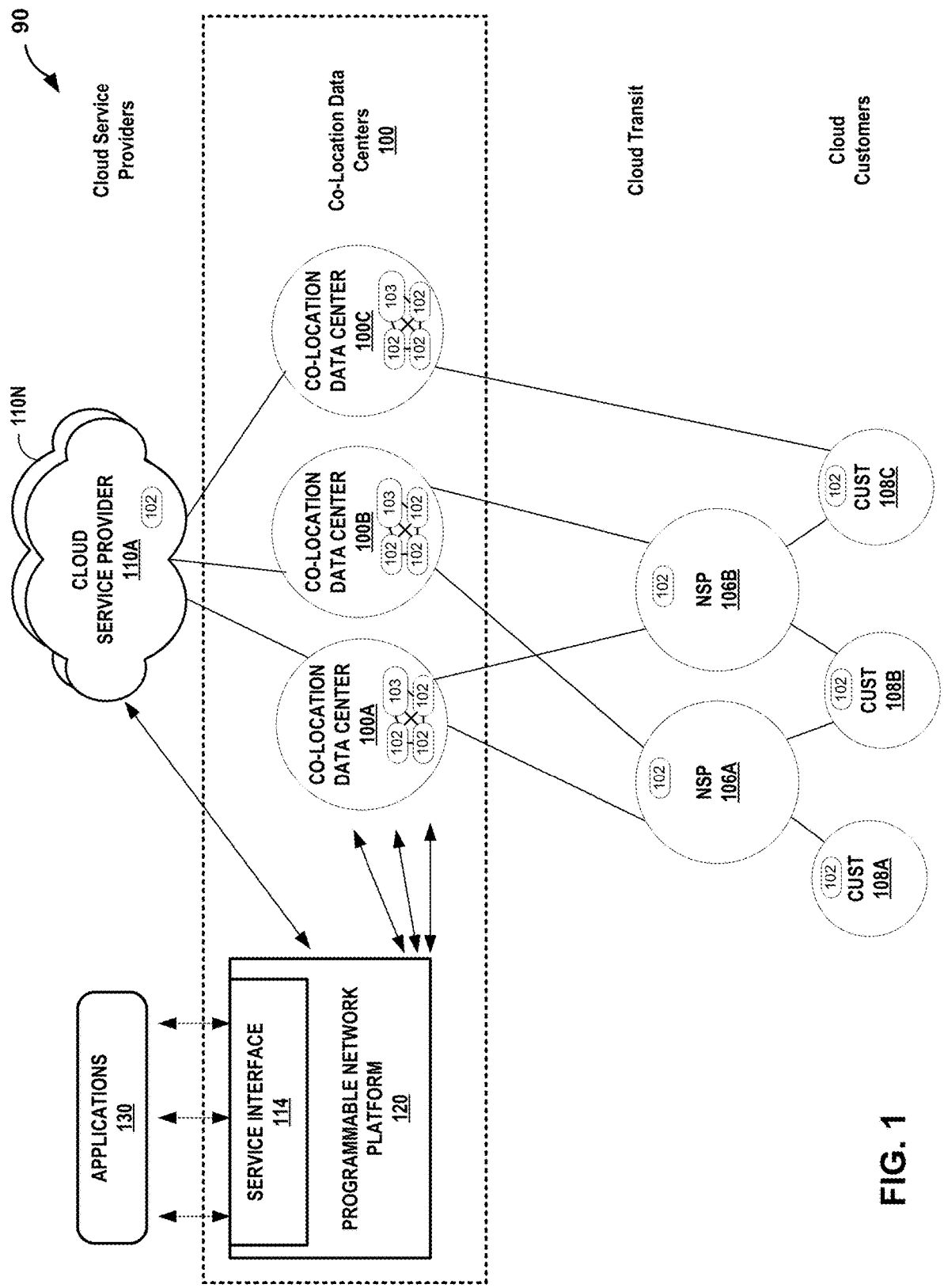
FIG. 1 is a block diagram illustrating an example system that performs time synchronization for a plurality of computing devices in a network exhibiting a delay effect.

Various aspects of the present disclosure implement techniques that enable precise time synchronization in real-time for eliminating/mitigating timing errors from network delays in clock systems. Real-world bidirectional paths between computing devices in a clock system exhibit network delay effects, which, if not accounted for by way of time synchronization, may impair the computing devices' functionality. Time synchronization may be modeled in one or more terms (e.g., model parameters, such as variables of a multi-variate equation), for example, a clock offset and a skewness. Some techniques are configured towards estimating the model parameters of a first model and then, correcting the model parameters with a second model (e.g., a correction model).

Timing protocols rely upon timestamp data corresponding to packet communications between computing devices in the network. For most timing protocols, an accurate clock offset is determined at a minimum path delay in these communications. For linear regression, a linear relationship holds true at the minimum path which is a lower bound of timestamp data. Modeling the minimum path can be difficult, especially during time periods of network induced delays. When the timestamp data is plotted on a graph, data points deviating from a true minimum path (or errors) in the timestamp data can be modeled in a linear regression model (e.g., function) as a normal distribution with a mean of zero (0) where a (representing the skewness) is a slope and b representing the clock offset) is the intercept, and E is the error:

$$\hat{Y} = aX + b + \epsilon.$$

In the use case of time synchronization, the above model may be used to compute estimates for the skewness and the offset model parameters. Using the above approach to model the minimum path is inaccurate because most error distributions in timestamp data are not normal. In addition, the points at the beginning and end of the bound are generally not along the line, which should not be used. Another potential drawback is that data points on the bound are sensitive to fluctuations in the timestamp data. Furthermore, the number of points on the bound can be only a few, which can cause large uncertainty in the estimation of regression model parameters. The techniques described herein provide substantial accuracy in the regression model of the true minimum path bound, for example, by introducing the correction model, the second model, to correct the estimates the model parameters.

Although described for examples related to time synchronization, there are other use cases for the techniques described herein. Another example use case in which the techniques of the disclosure may be applied is a technical financial analysis where a trend line is along the lower/upper points when the market is trending to the upside/downside over a period of time window. When the market is trending to the upside, resistance levels are formed as the price action slows and starts to pull back toward the trendline. On the other hand, when the market is trending to the downside, traders will watch for a series of declining peaks and will attempt to connect these peaks together with a trend line.

FIG. 1 is a block diagram illustrating an example system 90 that performs time synchronization for a plurality of computing devices (e.g., computing devices 102 and customer devices 108A-108C, hereinafter, "customer devices 108") that exhibit queuing delay between the plurality of computing devices. In general, a user such as customer 108A or a provider operator begins a user session with the portal application for engaging a co-location data center 100. As the user session makes service requests to various applications 130 within co-location data center 100, each of the applications 130 perform various sub-transactions to service the requests.

As illustrated by FIG. 1, co-location data centers 100A-100C ("co-location data centers 100") may provide an access point by which cloud-based services customers ("cloud customers") and cloud-based service providers ("cloud service providers") connect to receive and provide, respectively, cloud services. A co-location data center provider may deploy instances of co-location data centers 100 in multiple different metropolitan areas, each instance of co-location data center 100 having one or more co-location data center points (not depicted). A co-location data center may offer interconnection services, such as a cloud exchange, an Ethernet exchange, an Internet exchange, or cross-connections.

Co-location data centers 100 may include a cloud exchange and thus include network infrastructure and an operating environment by which cloud customers 108A-108C (collectively, "cloud customers 108") receive cloud services from multiple cloud service providers 110A-110N (collectively, "cloud service providers 110"). Cloud customers 108 may receive cloud services directly via a layer 3 peering and physical connection to co-location data centers 100 or indirectly via one of network service providers 106A-106B (collectively, "NSPs 106," or alternatively, "carriers 106"). NSPs 106 provide "cloud transit" by maintaining a physical presence within co-location data centers 100 and aggregating layer 3 access from one or customers 108. NSPs 106 may peer, at layer 3, directly with co-location data centers 100, and in so doing, offer indirect layer 3 connectivity and peering to one or more customers 108 by which customers 108 may obtain cloud services from the cloud service providers 110. Co-location data centers 100, in the example of FIG. 1, are assigned an autonomous system number (ASN). Thus, co-location exchange points are next hops in a path vector routing protocol (e.g., BGP) path from cloud service providers 110 to customers 108. As a result, any of co-location data centers 100 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, co-location data centers 100 may internalize the eBGP peering relationships that cloud service providers 110 and customers 108 would maintain on a pairwise basis. Rather, co-location data center 100 allows a customer 108 to configure a single eBGP peering relationship with co-location data centers 100 and receive, via the co-location data center, multiple cloud services from one or more cloud service providers 110. While described herein primarily with respect to eBGP or other layer 3 routing protocol peering between co-location data centers 100 and customer, NSP, or cloud service provider networks, co-location data centers 100 may learn routes from these networks in other way, such as by static configuration, or via Routing Information Protocol (RIP), Open Shortest Path First (OSPF), Intermediate System-to-Intermediate System (IS-IS), or other route distribution protocol.

In some examples, co-location data center 100 allows a corresponding one of customer customers 108A, 108B of any network service providers (NSPs) or "carriers" 106A-106B (collectively, "carriers 106") or other cloud customers including customers 108C to be directly cross-connected, via a virtual layer 2 (L2) or layer 3 (L3) connection to any other customer network and/or to any of CSPs 110, thereby allowing direct exchange of network traffic among the customer networks and CSPs 110.

Carriers 106 may each represent a network service provider that is associated with a transit network by which network subscribers of the carrier 106 may access cloud services offered by CSPs 110 via the co-location data center 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud services as are offered by the CSPs 110 via the co-location data center 100.

In this way, co-location data center 100 streamlines and simplifies the process of partnering CSPs 110 and customers (via carriers 106 or directly) in a transparent and neutral manner. One example application of co-location data center 100 is a co-location and interconnection data center in which CSPs 110 and carriers 106 and/or customers 108 may already have network presence, such as by having one or more accessible ports available for interconnection within the data center, which may represent co-location data centers 100. This allows the participating carriers, customers, and CSPs to have a wide range of interconnectivity options within the same facility. A carrier/customer may in this way have options to create many-to-many interconnections with only a one-time hook up to co-location data centers 100. In other words, instead of having to establish separate connections across transit networks to access different cloud service providers or different cloud services of one or more cloud service providers, co-location data center 100 allows customers to interconnect to multiple CSPs and cloud services.

Co-location data center 100 includes a programmable network platform 120 for dynamically programming a services exchange (e.g., a cloud exchange) of the co-location data center 100 to responsively and assuredly fulfill service requests that encapsulate business requirements for services provided by co-location data center 100 and/or cloud service providers 110 coupled to the co-location data center 100. The programmable network platform 120 as described herein may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the co-location data center 100 to dynamically configure and manage the co-location data center 100 to, for instance, facilitate virtual connections for cloud services delivery from multiple cloud service providers 110 to one or more cloud customers 108. The co-location data center 100 may enable cloud customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

Programmable network platform 120 may represent an application executing within one or more data centers of the co-location data center 100 or alternatively, off-site at a back office or branch of the cloud provider (for instance). Programmable network platform 120 may be distributed in whole or in part among the co-location data centers 100.

In the illustrated example, programmable network platform 120 includes a service interface (or "service API") 114 that defines the methods, fields, and/or other software primitives by which applications may invoke the programmable network platform 120. The service interface 114 may allow carriers 106, customers 108, cloud service providers 110, and/or the co-location data center provider programmable access to capabilities and assets of the co-location data center 100.

For example, the service interface 114 may facilitate machine-to-machine communication to enable dynamic provisioning of virtual circuits in the co-location data center for interconnecting customer and cloud service provider networks. In this way, the programmable network platform 120 enables the automation of aspects of cloud services provisioning. For example, the service interface 114 may provide an automated and seamless way for customers to establish, de-install and manage interconnection with multiple, different cloud providers participating in the co-location data center.

Applications 130 represent systems of engagement by which customers or internal operators for the co-locations data centers 100 may request services, request assets, request information regarding existing services or assets, and so forth. Each of applications 130 may represent a web portal, a console, a stand-alone application, an operator portal, a customer portal, or other application by which a user may engage programmable network platform 120.

In this example, each of co-location data centers 100 includes a set of computing devices 102, 103 that communicate via a network. In addition, co-located or other networks that receive interconnection and/or timing services from co-location data centers 100 may also include instances of computing devices 102. Networks associated with customers 108, NSPs 106, and cloud service providers 110 each include one or more instances of computing devices 102. Such networks may be co-located in one or more co-location data centers 100 or may have connections to the co-location data centers via an NSP connection, private connection, or other network connection. Accordingly, computing devices 102 located external to the co-location data centers 100 may receive timing services provided by timing servers of the co-location data centers 100.

Computing devices 102 may include storage systems and application servers that are interconnected via a high-speed switch fabric provided by one or more tiers of physical network switches and routers. For ease of illustration, FIG. 1 depicts three data centers 100A-100C, each of which has only a few computing devices 102. However, the techniques of the disclosure may be applied to large-scale networked systems that include dozens of data centers 100, each data center 100 having thousands of computing devices 102. Computing devices 102 may further include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other computing devices. In some examples, computing devices 102 may include top-of-rack switches, aggregation routers, and/or core routers.

Computing devices in a network may implement a clock synchronization protocol to synchronize a clock of each computing device with other computing devices on the network (e.g., a network within system 90 or the Internet). For example, a network system may implement clock synchronization protocol such as Network Time Protocol (NTP) or Precision Time Protocol (PTP) to perform clock synchronization. Further information with regard to NTP is provided in "Network Time Protocol Version 4: Protocol and Algorithms Specification," RFC5905, Internet Engineering Task Force (IETF) (June 2010), available at https://tools.ietf.org/html/rfc5905, the entire content of which is incorporated by reference. Further information with regard to PTP is provided in "Precision Time Protocol Version 2 (PTPv2) Management Information Base," RFC 8173, Internet Engineering Task Force (IETF) (June 2017), available at https://tools.ietf.org/html/rfc8173, the entire content of which is incorporated by reference.

As an example, time synchronization protocols such as NTP or PTP implement a master computing device that acts as a reference clock to provide reference timing signals to slave computing devices that synchronize their system time to the system time of the master computing device. However, NTP and PTP suffer from some accuracy issues. For example, NTP and PTP assume a well-defined minimum measured delay and a constant queuing delay. However, real-world bidirectional paths between computing devices exhibit dynamic variations in queuing delay, especially during time periods of heavy network traffic in both directions. Furthermore, the minimum measured delay becomes less well-defined during heavy network traffic and NTP and PTP cannot rely upon traditional algorithms for time synchronization, which depend upon the minimum measured delay for clock offset estimation. If used, the minimum measured delay imposes error in clock synchronization between two devices, limiting the precision with which clocks in a network may be synchronized to one another.

Master computing device 103 represents a computing device that is time server (i.e., master node) for a clock synchronization protocol, while one or more computing devices 102 are slave nodes that receive clock synchronization information from master computing device 103 with which to synchronize their local clocks to the master clock of master computing device 103.

In accordance with the techniques of the disclosure, a computing device, such as one of computing devices 102, master computing device 103, programmable network platform 120, or another computing device, facilitates time synchronization for computing devices 102 that experience network queuing delay along paths from the master computing device 103 to computing devices 102.

In some examples, programmable network platform 120 provides a synchronization service that allows precise and accurate synchronization of time with the distributed set of devices connected to high-precision GPS antennas. The synchronization service may support both the NTP and PTP standards. The synchronization service is deployed on highly available infrastructure, and may provide security via integration with a cloud exchange fabric security system. One or more of customers 108, NSPs 106, or CSPs 110 may make use of the synchronization service. One example of a time synchronization service in a cloud exchange system is provided by U.S. application Ser. No. 16/438,310, filed Jun. 11, 2019, the entire contents of which are incorporated by reference herein.

The computing device may implement any of the techniques described herein. In one example, the computing device includes processing circuitry that obtains timestamp data in accordance with a synchronization operation for a timing protocol, computes a skewness estimate and an offset estimate from the timestamp data by executing, over a number of iterations, a regression analysis, and corrects the first clock at the computing device in accordance with the synchronization operation for the timing protocol. The skewness estimate includes a frequency difference between a first clock at the computing device and a second clock at another computing device and the offset estimate includes a clock time difference between the first clock and the second clock. The regression analysis includes training a regression model (e.g., a machine learning model) to predict the offset estimate and the skewness estimate. The regression model includes parameters to apply to each line being targeted as a linear bound (e.g., minimum path). The parameters of the regression model are updated after each iteration of the number of iterations. At this point, the model parameters of offset and skewness are considered pre-estimates and as described herein, even after the update, the pre-estimated offset and skewness may be inaccurate for a number of reasons, such as noise, network load, path asymmetry, temperature, among other reasons. The timestamp data may fluctuate significantly (e.g., in terms of variance and uncertainty) due to jitter, queueing, cyberattack, and/or other (e.g., dynamic) factors present.

After the "pre-estimation" of the model parameters, the processing circuitry of the computing device performs a correction of the clock offset estimate and the skewness estimate and then, computes the corrected offset estimate and corrected skewness estimate. Some techniques direct the processing circuitry of the computing device to apply a Kalman filter (e.g., an adaptive Kalman filter) configured to model a processing error and/or a measurement error in the "pre-estimation" by the regression model.

As one example, the computing device, using the offset estimate and/or the skewness estimate, applies a correction term to correct an offset of the first clock. This may involve modifying a current time value of the first clock by a certain amount of time units (e.g., nanoseconds). Customers of computer networks may require high accuracy in timing, for instance, to effectuate high-frequency trading, multi-user gaming, and/or the like.

The techniques of the disclosure provide one or more specific technical improvements in computer networks. Further, the techniques of the disclosure provide specific practical applications to the field of time synchronization for computer networks. For example, the techniques of the disclosure allow for estimating and accounting for queuing delay along bidirectional paths between clocks of a plurality of computing devices on a network. Furthermore, the techniques of the disclosure may allow for the efficient clock time correction, even during time periods of heave network traffic or for an arbitrarily large network that has an arbitrarily large number of bidirectional paths between computing devices. Such techniques may allow for much more accurate time synchronization between the clocks of computing devices as compared to other methods. In addition, while primarily described herein in the context of a data center, the techniques of this disclosure may be applied to other contexts in which a master time server offers synchronization to one or more computing devices via a network.

The techniques of this disclosure do not assume symmetrical signal propagation delay for any bidirectional path between two computing devices, e.g., the time required for a signal sent from a first computing device to reach a second computing device is the same as the time required for a signal sent from the second computing device to reach the first computing device.

Some algorithms in conventional clock synchronization solutions may rely upon a minimum delay. However, there are a number of issues related to such reliance, especially during periods of heavy network traffic. As one example, the minimum delay is not well defined when there is considerable queueing effect. Application of a packet filter may not be effective during such time periods of heavy network traffic; for one reason, the variation in the separation between pairs of packets can be significant and cannot be assumed to be constant.

The distribution of the queuing delay may play an important role in the estimation of clock offset and skewness. When the level of network traffic is heavy, network queuing effects start to play an important role and the distribution of queuing induced delays is dynamic (e.g., non-linear), which has strong dependence on both the traffic load and the configuration of overall network. Moreover, the minimum measured delay is no longer be clearly defined. The techniques described herein differ from such solutions by properly modeling the dynamic variation of the queuing delay and eliminating the uncertainty (i.e., errors) from relying upon the minimum measured delay.

Some approaches utilize additional hardware to handle the dynamic queuing delay variation. PTP, for instance, may employ a Transparent Clock (TC) switch, which measures the residence time (e.g., the time that the packet spends passing through the switch or the router) and adds the residence time into the correction field of the PTP packet. In contrast, the techniques described herein may handle the dynamic delay variation without additional hardware.

Figure 2:
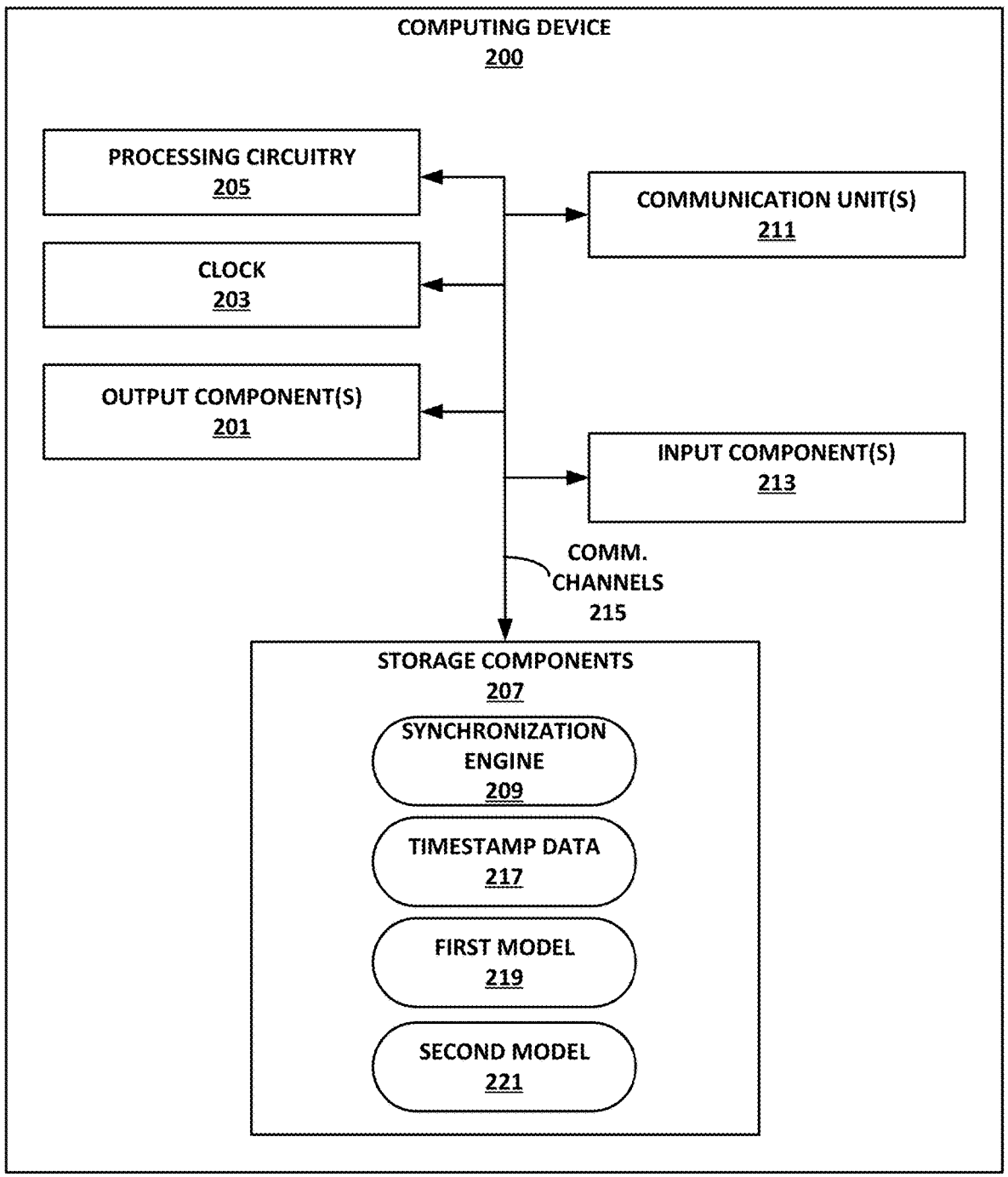
FIG. 2 is a block diagram illustrating an example computing device within the example system of FIG. 1 in accordance with one or more techniques of the disclosure.

FIG. 2 is a block diagram illustrating example computing device 200, in accordance with one or more techniques of the disclosure. Computing device 200 of FIG. 2 is described below as an example of one of computing devices 102 of FIG. 1 but may represent computing device 103, programmable network platform 120, or another computing device that is not in the network path between a master and slave but instead receives timestamp data and computes offset correction and/or frequency correction data as described here. FIG. 2 illustrates only one example of computing device 200, and many other examples of computing device 200 may be used in other instances and may include a subset of the components included in example computing device 200 or may include additional components not shown in example computing device 200 of FIG. 2.

As shown in the example of FIG. 2, computing device 200 includes processing circuitry 205, one or more input components 213, one or more communication units 211, one or more output components 201, and one or more storage components 207. Storage components 207 of computing device 200 include synchronization engine 209, timestamp data 217, first model 219, and second model 221. Communication channels 215 may interconnect each of the components 201, 203, 205, 207, 211, and 213 for inter-component communications (physically, communicatively, and/or operatively). In some examples, communication channels 215 may include a system bus, a network connection, an inter-process communication data structure, or any other method for communicating data.

One or more communication units 211 of computing device 200 may communicate with external devices, such another of computing devices 102 of FIG. 1, via one or more wired and/or wireless networks by transmitting and/or receiving network signals on the one or more networks. Examples of communication units 211 include a network interface card (e.g. such as an Ethernet card), an optical transceiver, a radio frequency transceiver, a GPS receiver, or any other type of device that can send and/or receive information. Other examples of communication units 211 may include short wave radios, cellular data radios, wireless network radios, as well as universal serial bus (USB) controllers.

One or more input components 213 of computing device 200 may receive input. Examples of input are tactile, audio, and video input. Input components 213 of computing device 200, in one example, includes a presence-sensitive input device (e.g., a touch sensitive screen, a PSD), mouse, keyboard, voice responsive system, video camera, microphone or any other type of device for detecting input from a human or machine. In some examples, input components 213 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output components 201 of computing device 200 may generate output. Examples of output are tactile, audio, and video output. Output components 201 of computing device 200, in one example, includes a PSD, sound card, video graphics adapter card, speaker, cathode ray tube (CRT) monitor, liquid crystal display (LCD), or any other type of device for generating output to a human or machine.

Processing circuitry 205 may implement functionality and/or execute instructions associated with computing device 200. Examples of processing circuitry 205 include application processors, display controllers, auxiliary processors, one or more sensor hubs, and any other hardware configure to function as a processor, a processing unit, or a processing device. Synchronization engine 209 may be operable by processing circuitry 205 to perform various actions, operations, or functions of computing device 200. For example, processing circuitry 205 of computing device 200 may retrieve and execute instructions stored by storage components 207 that cause processing circuitry 205 to perform the operations of synchronization engine 209. The instructions, when executed by processing circuitry 205, may cause computing device 200 to store information within storage components 207.

One or more storage components 207 within computing device 200 may store information for processing during operation of computing device 200 (e.g., computing device 200 may store data accessed by synchronization engine 209 during execution at computing device 200). Examples of timestamp data 217 accessed by synchronization engine 209 include records or tuples of actual timestamps corresponding to reception/transmission times for these packets, in addition to the measured delays. Timestamp data 217 further includes data describing measured delays for packets communicated between computing device 200 and other computing devices in a network. Other examples of the data accessed by synchronization engine 209 include model parameters, weights, and other model components for machine learning models, such as first model 219 (e.g., a regression model generated by a regression analysis) and second model 221 (e.g., a correction model for the regression model). In some examples, storage component 207 is a temporary memory, meaning that a primary purpose of storage component 207 is not long-term storage. Storage components 207 on computing device 200 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 207, in some examples, also include one or more computer-readable storage media. Storage components 207 in some examples include one or more non-transitory computer-readable storage mediums. Storage components 207 may be configured to store larger amounts of information than typically stored by volatile memory. Storage components 207 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 207 may store program instructions and/or information (e.g., data) associated with synchronization engine 209. Storage components 207 may include a memory configured to store data or other information associated with synchronization engine 209.

Clock 203 is a device that allows computing device 200 to measure the passage of time (e.g., track system time). Clock 203 typically operates at a set frequency and measures a number of ticks that have transpired since some arbitrary starting date. Clock 203 may be implemented in hardware and/or software. In accordance with the techniques of the disclosure, synchronization engine 209 performs time synchronization for one or more computing devices 102 that experience queuing delay along paths from master computing device 103 to the computing devices 102.

The processing circuitry 205 may implement any of the techniques described herein. In one example, processing circuitry 205 obtains timestamp data in accordance with a synchronization operation for a timing protocol and computes a skewness estimate and an offset estimate from the timestamp data using a weighted regression analysis. In some examples, skewness refers to a frequency difference between a first clock at a first computing device and a second clock at a second computing device; and an estimate of that frequency difference may be a slope of a bound (e.g., a line) of data points in the timestamp data such that, per each time step/interval, the first clock and the second clock drift apart by an amount of time defined by that estimate (if no clock time correction occurs). The offset estimate refers to a clock time difference between the first clock and the second clock, and an estimate of that clock time difference may be, at an initial time step/interval, a portion of an intercept of the same bound; then, at a next time step/interval, a summation of the initial clock time difference and the amount of time defined by the skewness estimate. The offset estimate increases by the skewness estimate for each subsequent time step/interval.

While the above formulation may be effective, estimation of the clock offset and skewness is sensitive to measured delay (e.g., minimum delay) variation, which dynamically changes with network load. Timestamp data 217 may be dynamically affected by jitter, network queueing, asymmetry, and other factors and therefore, recorded timestamps over a period of time may suffer from disruptive fluctuations. For at least this reason, the estimation of offset and skewness may be inaccurate by an unacceptable degree. Clock 203's frequency also drifts with certain noise level and jitter. These and other factors induce uncertainty (i.e., variance) in the clock offset estimate and skewness estimate, and while some known mechanisms may be able of reducing, for example, noise and jitter, example digital signal processing tools, such as a stationary noise model, may not be able to mitigate uncertainty (i.e., variance) beyond a certain magnitude. Another example digital signal processing tool, such as a Kalman Filter, is configured to reduce (e.g., measurement) error(s) in timestamp data 217, for example, by handling dynamic effects of noise due to queueing, jitter, attack and other effects.

The Kalman Filter, in some instances, may be adapted to (e.g., variations/errors in) timestamp data 217 where measured delays (e.g., trip times between clocks) do not follow a normal distribution. Synchronization engine 209 may employ the adaptive Kalman Filter (AKF) to perform precise time synchronization between clocks at two or more computing devices regardless of dynamic variation in the measured delays. The present disclosure describes the Adaptive Kalman Filter (AKF) as a machine learning construct configured to further reduce effects of (e.g., measurement) error(s) on performance of synchronization engine 29, thereby achieving a level of performance orders of magnitude better than a typical, non-adaptive KF.

As explained in the present disclosure and summarized as follows, a linear or non-linear regression analysis based on first model 219 results in estimates of offset $\tau$ and skewness $\theta$, which are feed into the adaptive Kalman Filter (AKF). The AKF, as described in further detail by the present disclosure for FIG. 5, determines an appropriate clock correction term based on an improved estimation of offset $\tau$ and skewness $\theta$.

The processing circuitry 205 computes an offset estimate and the skewness estimate based upon first model 219 to predict a slope and an intercept for the bound such that the slope can be used for the skewness estimate and the intercept can be used for offset estimate and a trip time. In general, first model 219 refers to at least one mathematical function that accepts, as input, the timestamp data, applies a set of parameters (e.g., a slope and an intercept) to the timestamp data, and produces, as output, the skewness estimate and the offset estimate.

In some examples, synchronization engine 209, executed by processing circuitry 205, computes the offset estimate and the skewness estimate based upon first model 219 or another model. Accordingly, first model 219 may be a linear regression method for these examples while in other examples, first model is a non-linear regression method. A weighted regression analysis determines and updates a set of weights to further converge the model parameters during training, improving upon a precision of these model parameters. The set of weights and an objective function are used to update the set of parameters in the machine learning model.

To improve upon an accuracy of the offset estimate and the skewness estimate, synchronization engine 209 may direct processing circuitry 205 in applying second model 221 to the offset estimate and the skewness estimate and computing a corrected offset estimate and a corrected skewness estimate. As described herein, second model 221 is configured to account for measurement error in timestamp data 217 and/or processing error in first model 219. In some examples of second model 221, a Kalman filter (KF) (e.g. an adaptive Kalman Filter) is configured to compute a Kalman gain as metric value representing the dynamic variation in timestamp data 217. By updating first model 219 with the Kalman gain, synchronization engine 209 may apply updated first model 219 to generate a new offset estimate and a new skewness estimate. These new estimates have been corrected to account for jitter, noise, among other factors.

In some examples, synchronization engine 209 may use second model 221 for generating indicia for anomaly detection. Synchronization engine 209 may review results of the above Kalman Filter (e.g., a Kalman gain) for faulty and/or erroneous measurements from timestamp data 217, which may indicate bad data, possible cyber-attacks, software failure, and other contributing factors or causes. By performing anomaly detection and handling any instance of an anomaly, synchronization engine 209 largely avoids effects from jitter. In some instances, synchronization engine 209 generates alerts for communication to other computing devices in a same clock system. Synchronization engine 209 may also communicate suspected examples of faulty and/or erroneous to a computing system for offline analysis.

Second model 221 may be implemented as machine learning architecture with a number of components. Second model 221 may include a processing model as described herein for incorporating the clock correction term into a prediction of more accurate (e.g., corrected) estimates for the skewness and offset. Another component model may compose of a measurement model for modeling a measurement residual (e.g., a measurement error). The above the Kalman Filter may be a composite machine learning construct that computes the Kalman gain from the processing model and measurement model.

In some examples, synchronization engine 209 generates a new or corrected clock correction term to include a number of seconds to add or subtract from clock 203 or another clock amongst computing device 102. In some examples, clock 203 is a reference clock, and clocks of other computing devices 102 are slave clocks synchronized to clock 203. In such examples, synchronization engine 209 applies, based on the values for the offset estimate in each direction of a bidirectional path, a time synchronization to each of the slave clocks of other computing devices 102 to synchronize the slave clocks of other computing devices 102 with clock 203. In other examples, synchronization engine 209 executes a time synchronization for clock 203 by adjusting a time value given by clock 203 in accordance with the new or corrected offset estimate; in one particular example, synchronization engine 209 may increase or decrease that time value by the offset estimate.

FIGS. 3A-3D illustrate four example networks in accordance with one or more techniques of the disclosure. Each example network 300 depicted in FIGS. 3A-3D include various hardware/software components (e.g., synchronization engines) to effectuate at least a portion of a timing protocol, such as a synchronization operation between clocks.

Figure 3A:
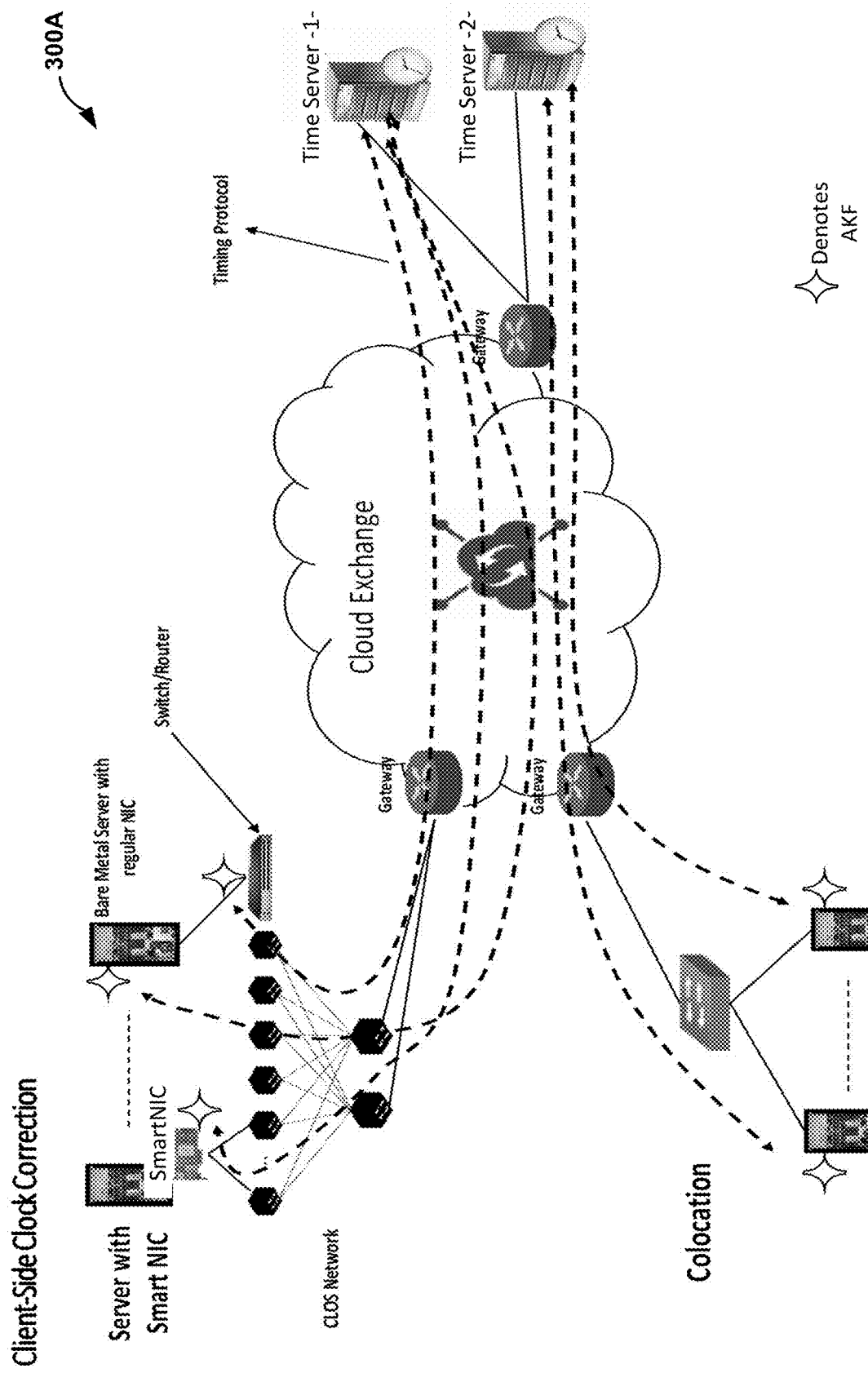
FIGS. 3A-3D illustrate four example networks in accordance with one or more techniques of the disclosure.

FIG. 3A illustrates an example network 300A in which at least one first (client-side) device and at least one second (server-side) device form a client-server architecture. A number of devices are depicted in FIG. 3A, namely, server-side computing devices herein referred to as time servers and client-side computing devices herein referred to as network devices such as routers and switches and bare metal servers configured with network interface cards (NIC); each of which includes processing circuitry to run a synchronization engine. Synchronization engines may be operative on both the client and server sides, and in the illustrated example of FIG. 3A, the synchronization engine configured with an Adaptive Kalman Filter (AKF) is operative on client-side device(s).

It should be noted that any client-side hardware/software component may be configured to run the synchronization engine configured with the AKF. In some examples, a CLOS network includes a smart ToR (i.e., Top of Rack) switch/router configured to run the synchronization engine configured with the AKF. In some examples, the bare metal servers depicted in FIG. 3A may include a (programmable) processor to execute logic for the synchronization engine configured with the AKF. The bare metal servers may employ a central processing unit (CPU), a data processing unit (DPU), or graphics processing unit (GPU), or another other class of processing circuitry. An example bare metal server having a regular NIC may run the above logic on a CPU while another example bare metal server having a smart NIC may run the above logic on a DPU or a GPU. In some examples, the smart NIC may include the processor to execute the logic for the synchronization engine configured with the AKF. As an alternative, the logic for the synchronization engine configured with the AKF may be programmed into logic circuitry formed by integrated circuits and affixed into the smart NIC and/or the bare metal servers (e.g., as a module).

Figure 3B:
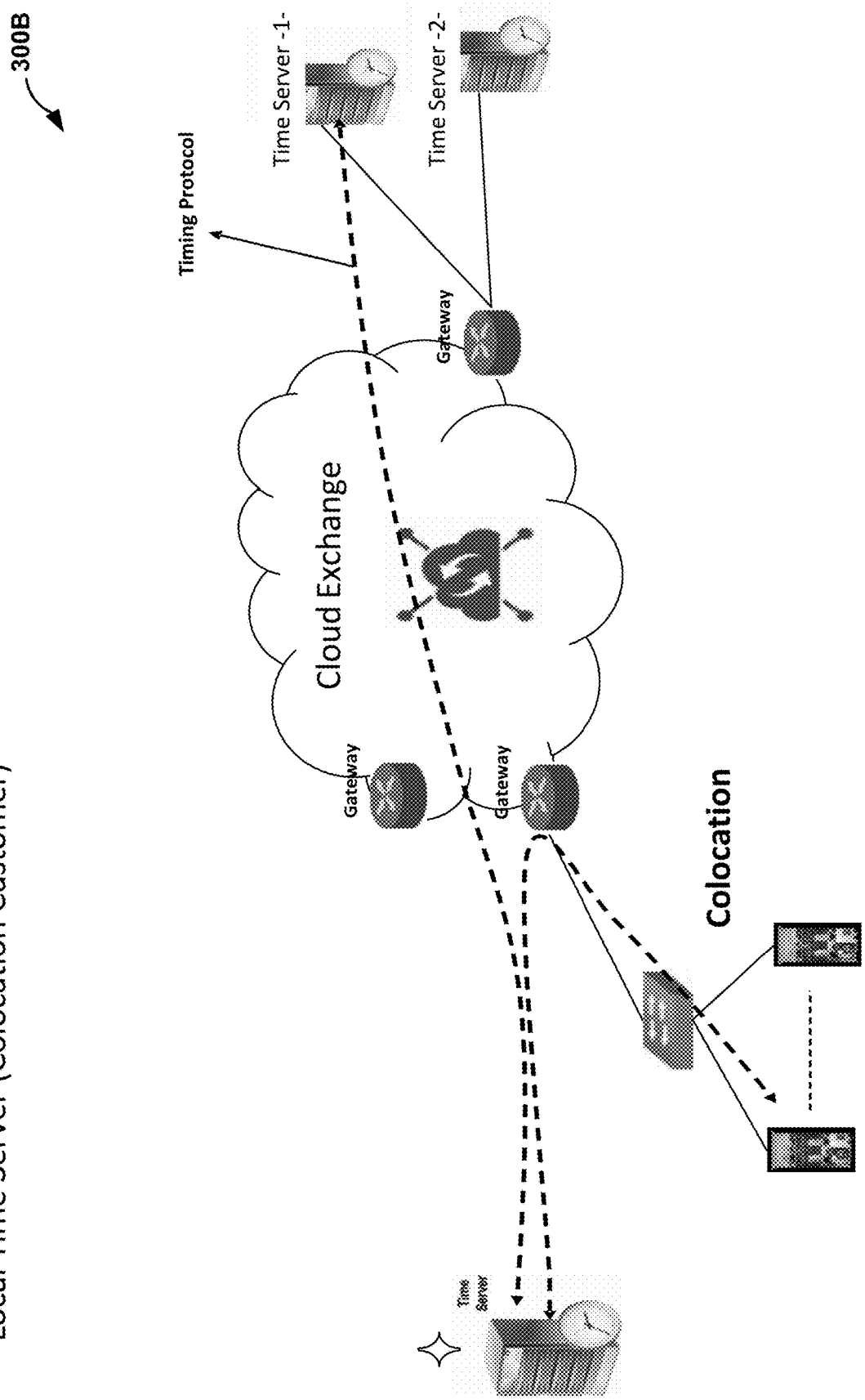

FIG. 3B illustrates an example network 300B in which at least one first (client-side) device and at least one second (server-side) device form a client-server architecture. A number of devices are depicted in FIG. 3B, namely, server-side computing devices herein referred to server-side time servers and client-side computing devices herein referred to client-side time servers and bare metal servers configured in a co-located data center; each of which includes processing circuitry to run a synchronization engine. In the illustrated example of FIG. 3B, the synchronization engine configured with an Adaptive Kalman Filter (AKF) is operative on a local (client-side) time server amongst the client-side devices.

In some examples, the local time server (e.g. in the same Metro/IBX with the customer compute and network resources) runs the AKF for time precision and can serve accurate time information to the local bare metal servers and/or Colocation customer computing devices.

Figure 3C:
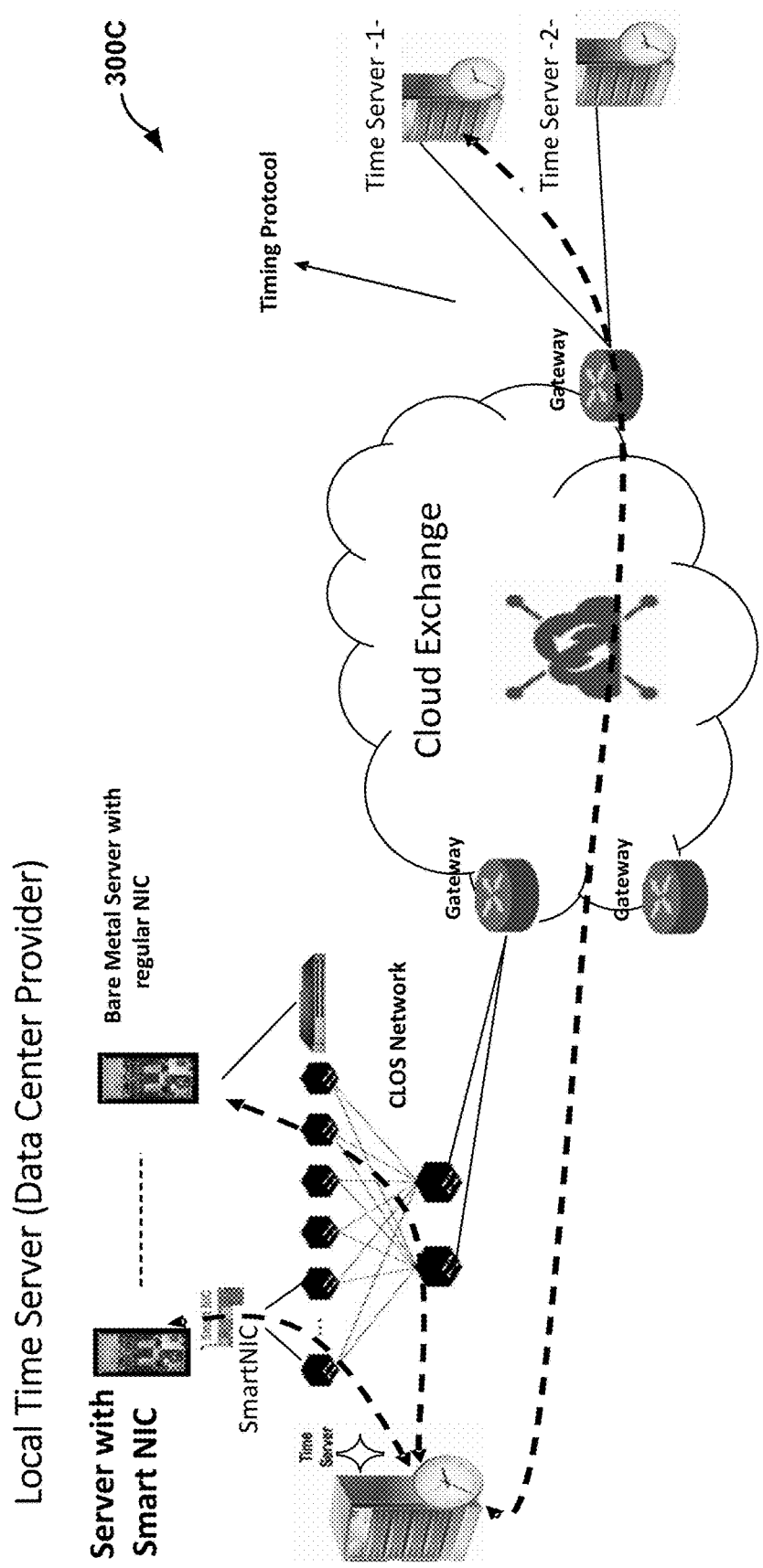

FIG. 3C illustrates an example network 300C in which at least one first (client-side) device and at least one second (server-side) device form a client-server architecture. A number of devices are depicted in FIG. 3C, namely, server-side computing devices herein referred to as (server-side) time servers and client-side computing devices herein referred to as (client-side) time servers and bare metal servers configured with network interface cards (NIC); each of which includes processing circuitry to run a synchronization engine configured with an Adaptive Kalman Filter (AKF). Synchronization engines may be operative on both the client and server sides, and in the illustrated example of FIG. 3C, the synchronization engine configured with the AKF is operative on a local time server.

In some examples, the local time server performs time synchronization operations to benefit local customers with clock correction terms for their servers and/or bare metal servers. The local time server may serve these clock correction terms to other local servers over a CLOS network.

Figure 3D:
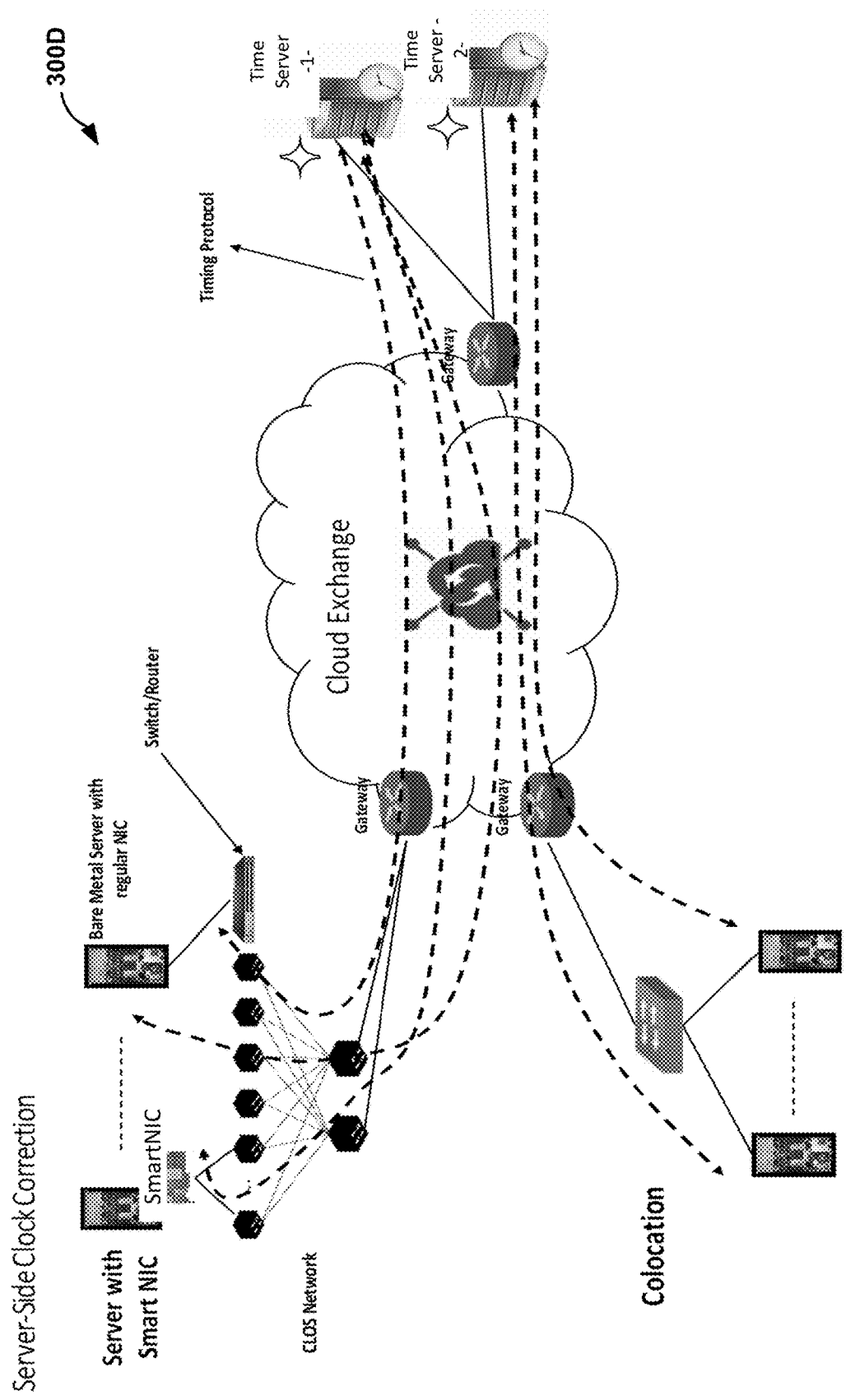

FIG. 3D illustrates an example network 300D in which at least one first (client-side) device and at least one second (server-side) device form a client-server architecture. A number of devices are depicted in FIG. 3C, namely, server-side computing devices herein referred to as time servers and client-side computing devices herein referred to as bare metal servers configured with network interface cards (NIC); each of which includes processing circuitry to run a synchronization engine configured with an Adaptive Kalman Filter (AKF). Synchronization engines may be operative on both the client and server sides, and in the illustrated example of FIG. 3C, the synchronization engine configured with the AKF is operative on a remote (server-side) time server.

Figure 4A:
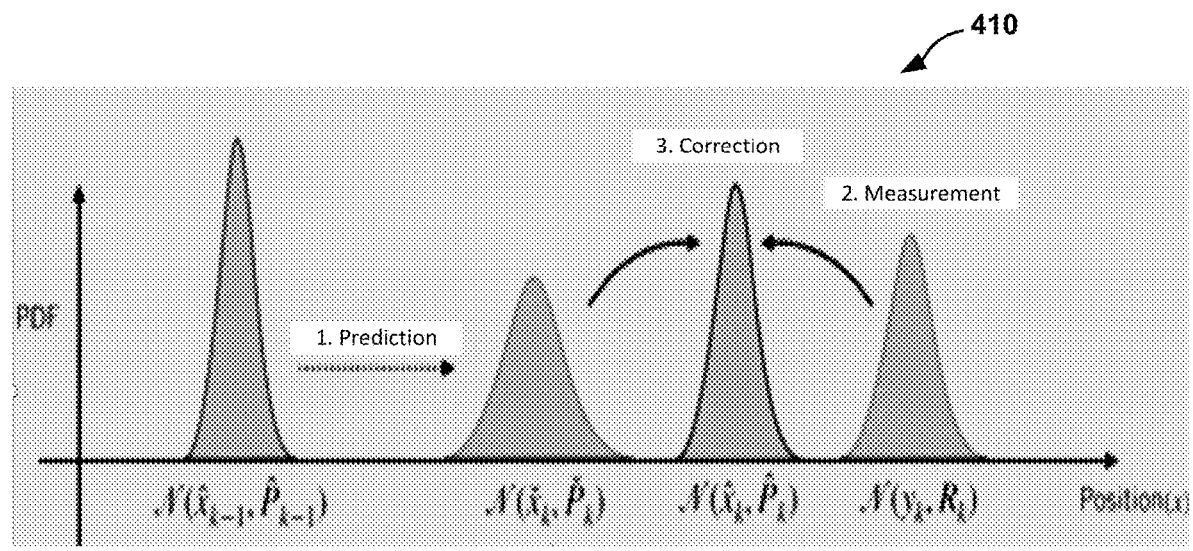
FIG. 4A is an illustration of an estimation correction of a network delay in timestamp data in a network in accordance with one or more techniques of the disclosure.

FIG. 4A illustrate an example process for correcting model estimation of an offset and skewness in a network in accordance with one or more techniques of the disclosure. In the example of FIG. 4A, process 410 is represented by probability density functions (PDFs) in a progression that is partitioned into a number of stages: a first (prediction) stage, a second (measurement) stage, and a third (correction) stage. In general, the first stage provides a first prediction model's estimation of the offset and skewness, the second stage provides a (e.g., partial) measurement value of the offset and skewness, and the third stage provides a second prediction model's correction of the estimated of the offset and skewness.

The first stage may depict the process state distribution propagates (e.g., updated) into a new state distribution during one time interval. The second stage may depict a measurement distribution. Based on the first stage and the second stage, the third stage may depict a corrected state distribution.

As described herein, computing devices of a clock system run synchronization engines to maintain clock precision amongst the devices. Incorporating an adaptive Kalman Filter (AKF), the synchronization engine may take advantage of a machine learning construct such as the one described in FIG. 5; for example, the synchronization engine may reject certain measurements as faulty or erroneous. The Kalman filter provides a mechanism for detecting candidate measurements for exclusion. The following summarizes example steps in process 510 for anomaly detection.

The first stage provides data indicating whether there is an anomaly in state space $\hat{X}$. At the first stage, a synchronization engine computes $\overline{X}$ as the exponential moving average of state space $\hat{X}$. The following pair of equations allows the synchronization engine to determine whether state space $\hat{X}$ has an anomaly where the state error is defined as $\eta_k = \hat{X}_k - \overline{X}_k$:

$$\eta_k^2[1,1] \geq \lambda^2 P_k[1,1]$$

$$\eta_k^2[2,1] \geq \lambda^2 P_k[2,2]$$

In the above (first) pair of equations, $P_k$ refers to a state space covariance matrix representing a distribution for the processing error. If both equations resolve into true statements for input state space $\hat{X}$, the synchronization engine generates an alert indicating, for example, an "abnormal state", "anomaly", among other examples.

The second stage provides data indicating whether there is an anomaly in measurement space (e.g., residual). At the second stage, a synchronization engine computes the measurement residual and its variance (e.g., error distribution) and determines whether measurement residual exceeds the covariance of measurement errors.

The measurement residual may be determined by computing difference value(s) between model parameter(s) and corresponding measurement(s). The measurement residual is mathematically codified as an innovation term $d_k$. As described herein, the innovation term can be observed, and in some examples, may be a scalar Gaussian random variable with a mean statistic of zero and a variance statistic $S_k = S_k P_k^- H_k^T + R_k$.

If the synchronization engine determines that the value of the innovation term is out of (upper/lower) bounds set to $\pm \lambda \sigma_{zk}$ values with $\lambda$ in the range of 2 to 3, where $\sigma_{zk}^2 = \text{diag}\{S_k\}$, the measurement may be declared invalid and/or one or more subsequent operations (e.g., of the second stage and/or the third stage such as a corresponding measurement update (state and covariance)) may be skipped. The term diag denotes the diagonal term of the matrices. For instance, the corresponding terms of offset and skewness in $\sigma_{zk}^2$ are given by $S_k[1,1]$, $S_k[2,2]$, respectively. The above may define criteria for detecting an anomaly in the measurement residual can be written explicitly as the following second pair of equations:

$$d^2_k[1,1] \geq \lambda^2 S_k[1,1]$$

$$d^2_k[2,1] \geq \lambda^2 S_k[2,2]$$

The synchronization engine may detect an example anomaly based on an evaluation of the above second pair of equations, given the corresponding measurements of interval k If the synchronization engine determines that both of the second pair of equations resolve to true statements, the synchronization engine may generate output data indicate of the detected anomaly in measurement residual. The synchronization engine may generate an alert indicating "abnormal measurement residual" and then, communicate that alert to other computing devices in a same clock system. In addition, the synchronization engine may determine that the corresponding measurement(s) are to be considered bad data, negating a reason for a measurement update.

Figure 4B:
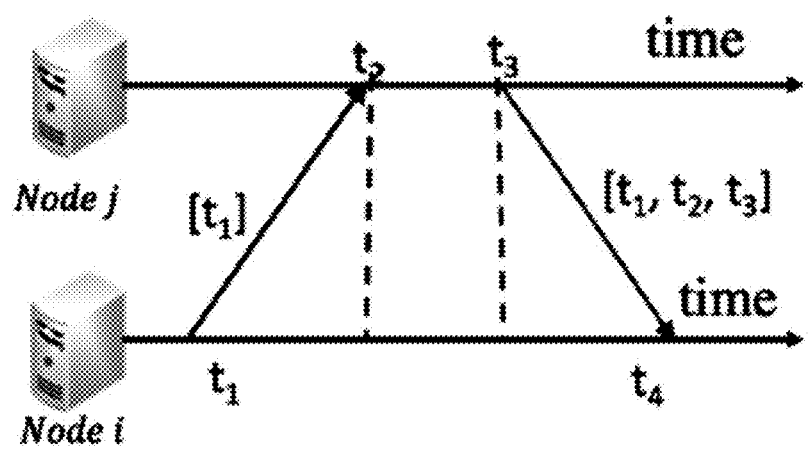
FIG. 4B illustrates signaling and trip times for two-way communications between two computing devices.

FIG. 4B illustrates signaling and trip times for two-way communications between two computing devices. Signaling refers to timestamps between clocks at Node i (a first computing device) and Node j (a second computing device): $t_1$ is timestamp of the packet leaving the sender according to the sender (Node i); $t_2$ is timestamp of the packet arriving at the receiver according to the receiver (Node j); $t_3$ is timestamp of the packet leaving the sender according to the sender (Node j); and $t_4$ is timestamp of the packet arriving at the receiver according to the receiver (Node i). Hence, $t_1$ and $t_2$ are the corresponding transmit and receive timestamps in forward direction and $t_3$ and $t_4$ are for reverse direction. D is the trip time in each way which is assumed to be the same.

When a timing protocol executes a time synchronization operation, an offset between the two clocks at Node i and Node j is determined and used to synchronize one of the clocks. Due to the delay of the network, the measured delays between the nodes vary. Therefore, finding the offset at a minimum path bound means minimum network traffic effect on the measured delay. The techniques described herein implement a weighted regression analysis to identify the minimum path as a bound (e.g., a lower or upper linear/non-linear bound) on the measured delays. The one-way communications and two-way communications described herein may be used in a one-way scheme and a two-way scheme for modeling one or multiple bounds in the timestamp data.

Consider, for instance, the example illustrated in FIG. 4B which shows one node sending a timestamped packet which records a local time ($t_1$) and another node recording its local time at the receiver ($t_2$) when it receives the packet such that D is the trip time and vice versa in a reverse direction. These timestamps have the following linear relationship:

$$t_2 - t_1 = D + \theta \text{ and}$$

$$t_3 - t_4 = -D + \theta.$$

In the above relationship, $\theta$ is the clock time difference that can be described as:

$$\theta(t) = \alpha t + \beta$$

where $\alpha$ is a frequency difference (i.e., skewness estimate) between of the two nodes and $\beta$ is the initial clock time difference (i.e., the offset estimate at t=0). A value may be computed for the clock time difference $\theta = \Delta f / f_r = (f_c - f_r) / f_r$ with $f_r$ as the reference clock's frequency and $\Delta f$ as the frequency difference between the server's clock and reference(master) clock.

For a linear bound (e.g., the minimum path bound), the slope gives $\alpha$ and intercept gives $D+\beta$ such that:

$$t_2 - t_1 = \alpha t + D + \beta.$$

When D is known and there is no network induced delay, the frequency difference and the initial clock difference may be learned using the linear regression model. In examples where there is a network induced delay (e.g., dynamic and/or high network traffic loads), another mechanism may perform an alternative analysis (e.g., a weighted regression analysis) to target a lower bound where D has a minimum. The above linear relationship is true only on minimum path. In some examples, a non-negative delay is added to D due to the network effect. By targeting the minimum path as the linear bound, a one-way communication scheme builds and trains a linear regression model as:

$$t_2 - t_1 = \alpha t + \beta + D - e.$$

When D is unknown, the synchronization engine and a two-way scheme may be used to estimate the skewness estimate and the offset estimate. The Precision Time Protocol (PTP) is an example of the two-way scheme. In the two-way scheme (differently from a one-way scheme), the two nodes communicate in the reverse direction and the forward direction such that each node sends and receives one packet. With the assumption of same trip time D in both directions, the timestamps may be modeled with the following relationship:

$$t_2 - t_1 = D + \theta, \text{ and}$$

$$t_3 - t_4 = -D + \theta.$$

In the two-way scheme and similar to the one-way scheme, two linear bounds can be targeted and modeled from timestamp data in two datasets ($t_2 - t_1$) and ($t_3 - t_4$) such that these linear bounds share a same slope $\alpha$, which is the skewness estimate, and an average of the intercepts $b_1$ and $b_2$ provides the offset estimate at time t=0, as illustrated in the following:

$$t_2-t_1=\alpha t+b_1,$$

$$t_3-t_4=\alpha t+b_2,$$

and $\beta = \frac{1}{2}[b_2 + b_1]$.

Combining the above relationship with the above equations results in $b_1$ and $b_2$ being equal to $\beta+D$ and $\beta-D$ and the two-way scheme becomes the following:

$$t_2-t_1=\alpha t+\beta+D,$$

$$t_3-t_4=\alpha t+\beta-D,$$

and $\beta = \frac{1}{2}[\beta - D + \beta + D]$.

Figure 5:
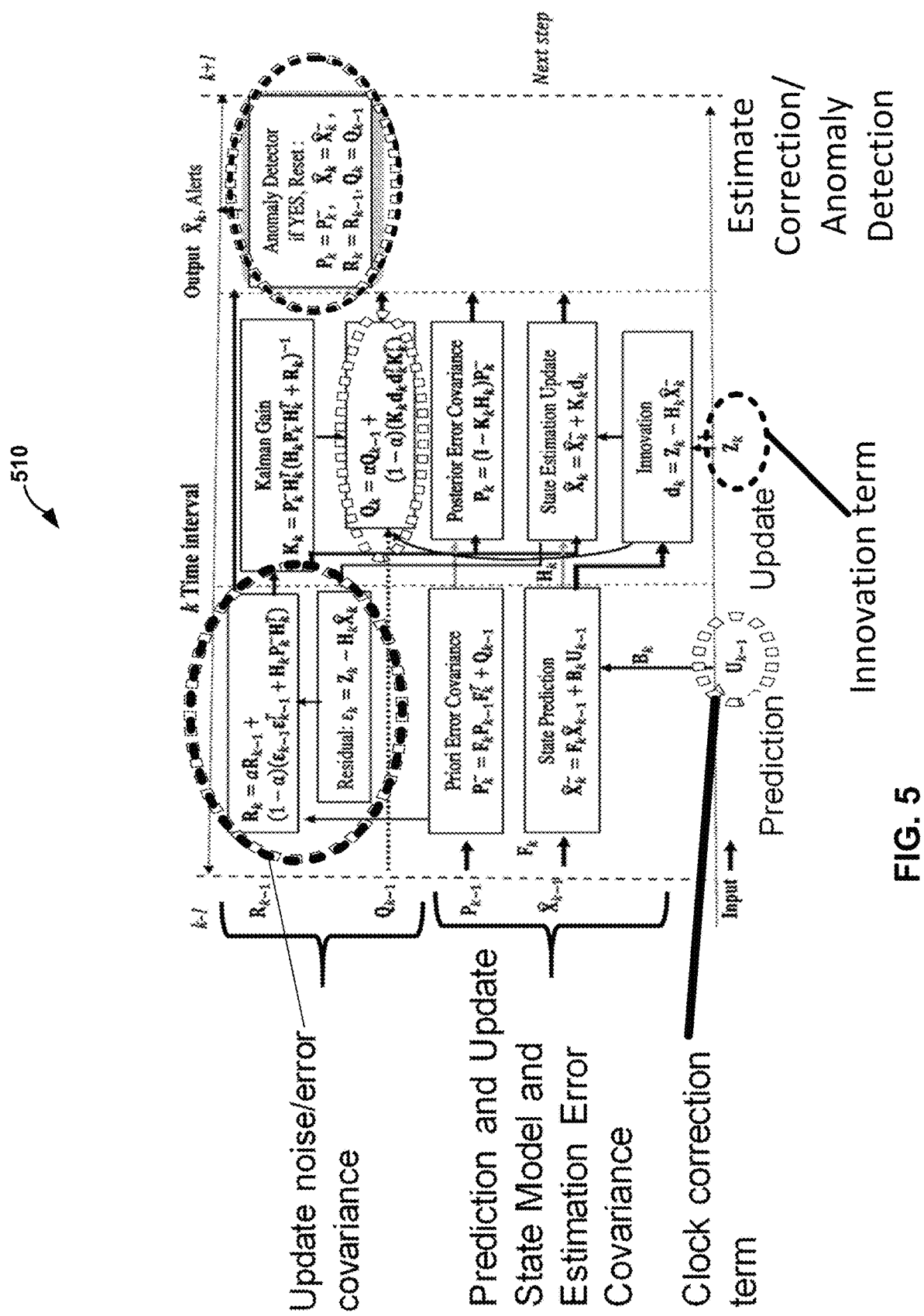
FIG. 5 is a conceptual diagram of a Kalman Filter analysis in accordance with one or more techniques of the disclosure.

FIG. 5 is a conceptual diagram of an example Kalman Filter analysis in accordance with one or more techniques of the disclosure. The example KF analysis may define offset $\tau$ and skewness $\theta$ to represent a current status of at least one clock in a clock system. As described herein, a regression analysis uses a first prediction model and timestamp data to generate estimates for offset $\tau$ and skewness $\theta$ that are feed into a module configured to perform the example KF analysis, for example, for a more precise estimation. In the example illustrated in FIG. 5, Kalman Filter (KF) analysis 510 is represented as a flow of difference computations and evaluations.

KF analysis 510 may first introduce a model for the entire clock system: $X_{k+1}=F_{k+1}X_k+B_{k+1}U_k+w_k$. KF analysis 510 may further introduce a measurement model defined as $Z_{k+1}=H_kX_k+v_k$ where X represents a (processing) state space and subscript k denotes the state space (e.g., measurements corresponding to variables) at kth time interval with constant interval as $\Delta t$.

There are a number of model components employed by KF analysis 510. As described herein, model components (e.g., variables) B, F, H, U, and/or Z of the above equations represent vectors or matrices of which some include scalars and/or second model components (e.g., input variables) corresponding to measurements from timestamp data. Other model components may include specific model parameters that are trained to render a prediction.

In some examples, the state space X may include model parameters offset $\tau$ and skewness $\theta$ in a (state space) vector, which may be denoted as $X=[\tau, \theta]^T$ where superscript T is transpose operator. In some examples, KF analysis 510 defines F as follows, which is a (e.g., constant) matrix that represents a state transition function (e.g., matrix) relating $X_k$ to $X_{k+1}$ in the absence of a forcing function:

$$\begin{bmatrix} 1 & \Delta t \\ 0 & 1 \end{bmatrix}.$$

In some examples, KF analysis 510 defines U as follows, which is a control (external) input vector to represent a clock correction term at every time interval:

$$\begin{bmatrix} \Delta \tau \\ \Delta \theta \end{bmatrix}.$$

In some examples, KF analysis 510 defines B as follows, which is a (e.g., constant) control matrix:

$$\begin{bmatrix} 1 & \Delta t \\ 0 & 1 \end{bmatrix}.$$

In some examples, KF analysis 510 defines $Z=[\tau, \theta]^T$, which as a measurement vector of the offset and skewness. In some examples, KF analysis 510 defines measurement function H as follows, which is a (e.g., constant) matrix representing an ideal (noiseless) connection between the measurement vector and the state space vector:

$$\begin{bmatrix} 1 & 0 \\ 0 & 1 \end{bmatrix}.$$

It should be noted that even though matrices F, B and/or H are constant in some examples, the KF analysis 510 retains the subscript k to represent the general case where they may change over time. In some examples, KF analysis 510 defines was an unmodeled parameter and v as an uncertainty metric value of the measurement (e.g., measurement error). In some examples, KF analysis 510 assumes w and v to be configured as uncorrelated Gaussian white noise sequences with a mean and covariance matrices given by the following:

$$E[w_k w_i^T] = \begin{cases} Q_k & \text{if } k = i \\ 0 & \text{if } k \neq i \end{cases}$$

$$E[v_k v_i^T] = \begin{cases} R_k & \text{if } k = i \\ 0 & \text{if } k \neq i \end{cases}$$

$$E[w_k v_i^T] = 0, \text{ for all } k \text{ and } i$$

In the above equations, covariance matrices Q and R represent processing and measurement errors, respectively, and E denotes expected values for the covariance matrices in the brackets. The covariance of the processing error depends on uncertainty of the clock's frequency drift and the applied clock correction term. The covariance of the processing error may increase if the measurement residual increases for each measurement. This dynamically includes the impact of network queueing and other factors. Based on covariance matrices Q and R, the state space X can be estimated using the measurement values through Kalman Filter analysis 510. As described herein, Kalman Filter analysis 510 incorporate the covariance matrices Q and R in correcting the offset and skewness estimates, for example, by generating a Kalman gain to account for dynamic variation in timestamp data. With state space X as the processing model and an estimated state space $\hat{X}$, an example of Kalman Filter analysis 510 typically includes the following when correcting the estimated state space:

First, Kalman Filter analysis 510 performs state initialization operation where:

$\hat{X}_0 = E[X_0]$ and $P_0 = E[\hat{X}_0 \hat{X}_0^T]$.

Second, Kalman Filter analysis 510 performs a series of operations for after each time interval from $(k-1)\Delta\tau$ to $k\Delta\tau$. In some examples of the series of operations, Kalman Filter analysis 510 is configured to predict the state space based on a previous state space, update the measurement model, and then, correct the predicted stated space into a more accurate estimate of offset and skewness.

In some examples, after receiving a clock correction term $U_{k-1}$ for a last interval, Kalman Filter analysis 510 performs a state prediction operation in which the state space model and a state space prior covariance matrix of estimation error are predicted as follows:

$$\hat{X}_k = F_{k+1}\hat{X}_{k-1} + B_k U_{k-1} \text{ and}$$

$$P^-_k = F_k P_{k-1} F_k^T + Q_{k-1}.$$

A Kalman gain represents the update to the measurement model based upon timestamp data over kth interval. In some examples, Kalman Filter analysis 510 performs an estimation of the Kalman gain as follows:

$$K_k = P_k^- H_k^T (H_k P_k^- H_k^T + R_k)^{-1}.$$

In some examples, Kalman Filter analysis 510 receives an innovation term d that, at kth interval, may be defined as $d_k = Z_k - H_k \hat{X}_k^-$. In some examples, Kalman Filter analysis 510 performs an update of the state space and the state covariance matrix based on the estimated Kalman Gain:

$$\hat{X}_k = \hat{X}_k + K_k d_k \text{ and}$$

$$P_k = (I - K_k H_k) P_k^-.$$

In some examples, upon completion of the above series of operations over k intervals, Kalman Filter analysis 510 extracts corrected estimates $\hat{t}$, $\hat{\theta}$ and then, generates a new clock correction term. In the above model, the processing error and measurement error are assumed to be constant (stationary model).

An adaptive embodiment of Kalman Filter analysis 510 may assume dynamic variation in the processing and measurement errors as well as the timestamp data. In some examples, the queueing effect along with jitter and other factors dynamically change and therefore the induced errors change over time. The covariance of the errors may be updated accordingly to address their impacts.

The processing error can be estimated as $e_x \approx \hat{X}_k - \hat{X}_k^- = K_k d_k$. This equation demonstrates that the innovation term for measurement error $d_k$ affects the processing error through the Kalman gain. Then, the covariance matrix of the system process noise can be updated as follows:

$$Q_k = K_k E[dd^T] K_k^T.$$

To implement above equation, $E[dd^T]$ usually approximated by means of averaging $dd^T$ over time using a windowing method. Instead of using moving window methods, our method adaptively adjusts Q by utilizing a weighting factor a to balance the last noise covariance value and current estimation. Therefore, the system processing noise covariance matrix is updated as $Q_k = \alpha Q_k + (1-\alpha)(K_k d_k d_k^T K_k^T)$.

When the weighting factor $\alpha$ is set with a lower limit $\alpha \in (0, 1)$ the past influences die out quickly. The measurement covariance is updated using exponential moving average in a similar way as $R_k = \alpha R_{k-1} + (1-\alpha)(\epsilon_k \epsilon_k^T + H_k P_k^- H_k^T)$ where residual (posterior innovation) $\epsilon$ is given by: $\epsilon = Z_k - H_k \hat{X}_k$.

In some examples, Kalman Filter analysis 510 may perform one or more additional operations or use an alternative model. As an option, Kalman Filter analysis 510 may evaluate the state space model and/or the measurement model for indicia of faulty or erroneous data (e.g., measurements). As described in some detail for FIG. 4, Kalman Filter analysis 510 may perform such an evaluation to determine whether there are sufficient indicia to reject at least one measurement. Kalman Filter analysis 510 may determine that the measurements should not be used in a model correction and therefore, proceed to determining the clock correction term after predicting the state space (e.g., computing the skewness and offset estimates).

Alternatively, the state space can include the slope of the skewness $\alpha_k$ as $X_k = [\tau_k, \theta_k, \alpha_k]^T$, then the corresponding matrices are changed as the following:

$$F = \begin{bmatrix} 1 & \Delta t & \frac{(\Delta t)^2}{2} \\ 0 & 1 & \Delta t \\ 0 & 0 & 1 \end{bmatrix},$$

$$H = \begin{bmatrix} 1 & 0 & 0 \\ 0 & 1 & 0 \end{bmatrix},$$

$$B = \begin{bmatrix} 1 & \Delta t \\ 0 & 1 \\ 0 & 0 \end{bmatrix},$$

The matrix Z and U remain the same since the measured and controlled variables also remain the same.

Figure 6:
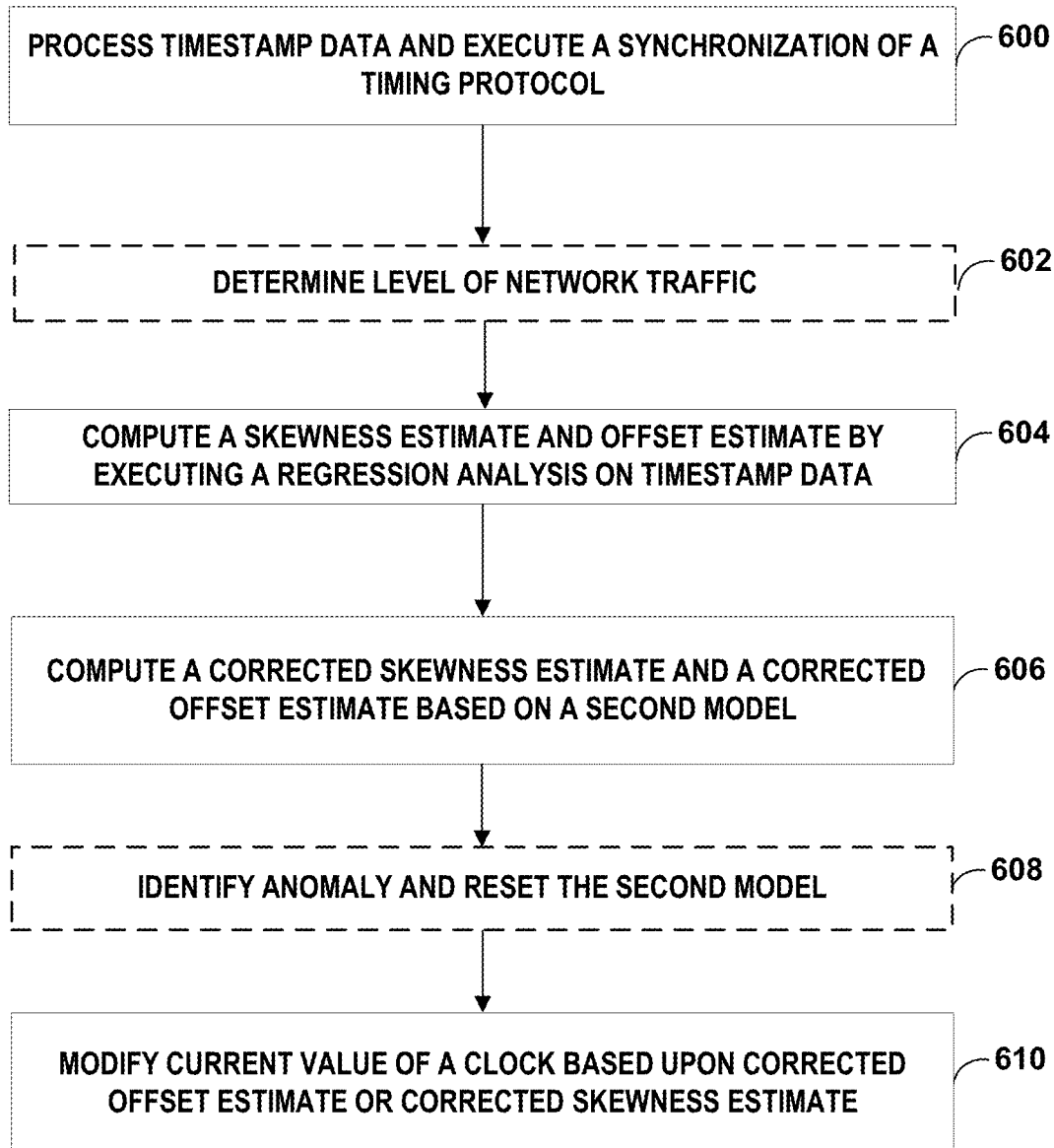
FIG. 6 is a flowchart illustrating an example time synchronization process for a plurality of computing devices in accordance with techniques of the disclosure.

FIG. 6 is a flowchart illustrating an example time synchronization process for a plurality of computing devices in accordance with techniques of the disclosure. For convenience, FIG. 6 is described with respect to FIGS. 1-5.

In general, processing circuitry 205 processes timestamp data (600) and executes a synchronization operation of a timing protocol. Processing circuitry 205 may determine a number of packet data measurements (e.g., statistical values). The present disclosure describes, in some detail for FIG. 4B, a number of examples where the timestamp data is observed and processed. Processing circuitry 205 may compute measured delays as a set of data points that form a (e.g., lower) bound for the measured delays in timestamp data. The regression analysis includes a linear regression machine learning model (i.e., "regression model") for predicting a skewness estimate and an offset estimate for the measured delays based upon a target bound representing a potential minimum path. The data points along the target bound should represent measured delays having a negligible amount of noise and network effect; therefore, the regression analysis includes refining, over a number of iterations, the regression model parameters (e.g., until a convergence test identifies an optimal or near-optimal target bound).

In the example of FIG. 6, processing circuitry 205 processes timestamp data (600). and, as an option, processes the timestamp data to determine a level of network traffic between computing devices (602). In general, network traffic refers to a measurement (e.g., a density) of protocol data units (e.g., network packets) being transmitted between devices over a time period. The timestamp data includes timestamps attributed to arrivals/departures of these protocol data units to/from computing devices in a network. From these timestamps, processing circuitry 205 determines (approximately) how many protocol data units are being transmitted through the network at a given moment as well as measured delays for these transmissions. The determination of whether network traffic is heavy may be established by comparing latencies to a threshold that is determined from lowest-latencies or configured by an operator. In another example, network traffic may be classified as heavy network traffic when fewer than a threshold number of network packets have a measured delay at or near a minimum time value amongst the measured delays for the transmissions. In a probability density function (PDF) describing network traffic in the network, each data point is a probability (p) that a network packet has a corresponding time value as a measured delay; if the probability for the minimum time value falls below a certain threshold (e.g., a threshold percentage), processing circuitry 205 determines that the network traffic is heavy. Hence, in this example processing circuitry determines a level of network traffic based upon a distribution of the PDF of measured delays in the network. In other examples, processing circuitry determines whether the network traffic is heavy based on traffic statistics collected by network device 200 based on sent and/or received packets.

Processing circuitry 205 computes a skewness estimate and an offset estimate by executing a regression analysis on the timestamp data (604). As described herein, the skewness estimate is a frequency difference between clock 203 at computing device 200 and a second clock at a second computing device and the offset estimate is a clock time difference between clock 203 and the second clock. Processing circuitry 205 may generate a graph plotting data points including a linear bound to target in a linear regression model to be used for predicting a skewness estimate and an offset estimate. A slope of the linear bound may be the skewness estimate and an intercept of the non-linear bound may include an initial clock time difference and a trip time. Therefore, the offset estimate is computed from a linear function of the initial clock time difference, the skewness estimate, and an elapsed amount of time.

In some examples, processing circuitry 205 executes, over a number of iterations, a regression analysis targeting the linear bound (e.g., minimum path) of the timestamp data. The regression model having parameters to apply to the at least one bound of the timestamp data. In some examples, processing circuitry 205 calibrates the skewness estimate and the offset estimate by, for each iteration of a number of iterations, updating the set of weights based upon an interaction distance measuring decay of the set of weights and updating the parameters of the regression model based upon an objective function and gradients of the parameters.

As explained in detail for FIGS. 4A-4B and FIG. 5, processing circuitry 205 computes an estimate for the offset τ and skewness θ using regression analysis and, representing the current status of clock 203, these estimates are feed into a Kalman filter or Adaptive Kalman Filter for better estimation. A regression line or curve at the minimum path may be used to pre-estimate the offset and skewness before the Kalman filter or Adaptive Kalman Filter because, as demonstrated herein, a simple (e.g., linear) relationship may not be exist between the covariance of measurement error (e.g., residual) and uncertainty in timestamp data and measured delays. Variances of measurement residual (e.g., error) and prediction error may be substantial and render inaccurate any prediction by the regression model.

Processing circuitry 205 computes a corrected skewness estimate, and a corrected offset estimate based on a second model (606). The second model takes the output of the regression model as input, which is more accurate than being trained on the timestamp data alone. In the example illustrated in FIG. 6, the second model may be partition into k intervals the timestamp data used in the above estimation and apply an adaptive Kalman filter to both the processing or state space error and the measurement error.

As an option, processing circuitry 205 identifies an anomaly in the measurement model and/or state space model and resets the second model (608). Variances of measurement residual (e.g., error) and prediction error may be substantial due to faulty and/or erroneous data. Based on a moving average of the "pre-estimated" skewness and offset (e.g., the state model), one or more samples of timestamp data may be discarded (e.g., as bad data).

Assuming no substantial anomaly was identified, processing circuitry 205 may modify a current value of a clock based upon the corrected skewness estimate and the corrected offset estimate (610). Both estimates may be combined into a clock correction term, such as a number of seconds to add or subtract from the clock of one or more computing devices of the clock system. Processing circuitry 205, via application of the clock correction term, may complete (e.g., at least a current interval) of the synchronization of the timing protocol.

In response to detecting an anomaly in the measurement model and/or state space model, processing circuitry 205 may generate an alert for communication to another device and/or presentation, via a graphical user interface (GUI), on a display device. Processing circuitry 205 may classify, as unusable, a current set of measurements and/or a previous set of offset and skewness parameters.

If computing device 200 operates as the slave device communicating packets with the master computing device, processing circuitry 205 may compute the corrected skewness estimate and the corrected offset estimate from the timestamp data associated with these packets and then, use the corrected skewness estimate and/or the corrected offset estimate to determine the amount of time to correct clock 203 (e.g., a clock correction term). In yet another embodiment, computing device 200 operates as the slave device and processing circuitry 205 provides the master computing device with the corrected skewness estimate and the corrected offset estimate from the timestamp data. In turn, the master computing device determines an appropriate amount of time for to adjust clock 203.

As described herein, the regression analysis may linear, non-linear, or any other known distribution for estimating the above clock correction term. In one example, the regression analysis refers to a predicted quadratic curve that is a non-linear bound of the measured delays. An example linear regression model may target the non-linear bound for predicting a skewness estimate and an offset estimate. A derivative of an acceleration term for the non-linear bound may produce a linear function for computing a slope at a particular time interval. That slope may be the skewness estimate for that time interval and an intercept of the non-linear bound may include an initial clock time difference and a trip time. The offset estimate is computed from a linear function of the initial clock time difference, the derivative of the acceleration term, and an elapsed amount of time.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method comprising:
obtaining, by processing circuitry of a first computing device in a network having a network topology of computing devices, timestamp data in accordance with a synchronization operation for a timing protocol, wherein the timestamp data describes one or more measured delays for a path between the first computing device and a second computing device of the network;
computing, by the processing circuitry, a skewness estimate and an offset estimate from the timestamp data by executing a regression analysis, wherein the regression analysis is configured to train a first model to predict the offset estimate and the skewness estimate, the skewness estimate comprising a frequency difference between a first clock at the first computing device and a second clock at the second computing device, the offset estimate comprising a clock time difference between the first clock and the second clock;
computing, by the processing circuitry, a corrected skewness estimate and a corrected offset estimate based on a second model having parameters based on the offset estimate and the skewness estimate; and
modifying, by the processing circuitry, a current time value of at least one of the first clock or the second clock based on at least one of the corrected offset estimate or the corrected skewness estimate.

2. The method of claim 1, wherein the first model is a linear regression model.

3. The method of claim 1, wherein computing the corrected skewness estimate and the corrected offset estimate further comprises performing a Kalman filter analysis of parameters of the first model, wherein the Kalman filter analysis is configured to determine at least one of a processing error or a measurement error.

4. The method of claims 1, wherein computing the corrected skewness estimate and the corrected offset estimate further comprises, at each time interval in the synchronization operation, updating parameters of the second model based upon parameters of the first model, timestamp data corresponding to the time interval, and an estimation error associated with the offset estimate and the skewness estimate.

5. The method of claim 4, wherein correcting the skewness estimate and the offset estimate based on the second model further comprises, in response to an anomaly in the timestamp data corresponding to a current interval in the synchronization operation, resetting parameters of the second model.

6. The method of claim 4, wherein the second model comprises a state model corresponding to a Kalman Filter analysis of parameters of the first model, and
wherein correcting the skewness estimate and the offset estimate based on the second model further comprises predicting parameters of the state model based on a prior time interval clock correction term, the predicted parameters comprising a predicted skewness estimate and a predicted offset estimate, and updating the parameters of the state model based on the predicted parameters, a Kalman gain estimate, and an innovation term, the innovation term comprising a residual between measurement data and the predicted parameters.

7. The method of claim 6, wherein updating the parameters of the state model based further comprises:
based on the at least one of a measurement error or a processing error, updating at least one covariance matrix configured to represent an uncertainty of the regression model; and
determining the Kalman gain estimate based on the covariance matrix configured to represent an uncertainty of the regression model.

8. The method of claim 6, wherein updating the parameters of the state model further comprises detecting the anomaly in the state model in accordance with:

$$|\eta_k| \geq \lambda \sigma_{xk}$$

where $\eta_k$ is a state error and $\eta_k = \hat{X}_k - \overline{X}_k$, $\hat{X}_k$ is the state model at $k^{th}$ interval, $\overline{X}_k$ is a moving average of the state model at $k^{th}$ interval, $\lambda$ is a scaler variable, and $\sigma^2$ is a variance for the state model and $\sigma^2{}_{xk}$ a diagonal term of $P_k = (I - K_k H_k) P_k^-$ where H is a measurement function, P is a state covariance matrix, $P_k^-$ is a prior state covariance matrix, K is a Kalman gain, and I is an identity matrix.

9. The method of claim 6, wherein updating the parameters of the state model further comprises detecting the anomaly in the measurement data in accordance with:

$$|d_k| \geq \lambda \sigma_{zk}$$

where $d_k$ is the innovation term and $d_k = Z_k - H_k \hat{X}_k^-$; $\lambda$ is a scaler variable; and $\sigma^2$ is a variance for the state model $\hat{X}_k$ and $\sigma_{zk}^2$ is a diagonal term of $S_k = H_k P_k^- H_k^T + R_k$ where H is a measurement function, P is a state covariance matrix, and R is a covariance of the measurement error.

10. The method of claim 6, wherein updating the state model based further comprises determining the measurement error based on historical error data and a first covariance matrix configured to represent an uncertainty of the measurement data; and determining the processing error, based on the historical error data, the measurement error, and a second covariance matrix configured to represent an uncertainty of the parameters of the state model.

11. A computing device comprising:
computer memory; and
processing circuitry coupled to the computer memory and configured to provide time synchronization for a plurality of clocks on a network, the processing circuitry operative to:
obtain timestamp data in accordance with a synchronization operation for a timing protocol, wherein the timestamp data describes one or more measured delays for a path between the computing device and a second computing device of the network;
compute a skewness estimate and an offset estimate from the timestamp data by executing a regression analysis, wherein the regression analysis is configured to train a first model to predict the offset estimate and the skewness estimate, the skewness estimate comprising a frequency difference between a first clock at the computing device and a second clock at the second computing device, the offset estimate comprising a clock time difference between the first clock and the second clock;
compute a corrected skewness estimate and a corrected offset estimate based on a second model having parameters based on the offset estimate and the skewness estimate; and
modify a current value of the at least one of the first clock or the second clock based on at least one of the corrected offset estimate or the corrected skewness estimate.

12. The computing device of claim 11, wherein the processing circuitry is further configured to: perform a Kalman filter analysis of parameters of the first model.

13. The computing device of claim 11, wherein the processing circuitry is further configured to: at each time interval in the synchronization operation, update parameters of the second model based upon timestamp data corresponding to the time interval and an estimation error associated with the offset estimate and the skewness estimate.

14. The computing device of claim 11, wherein the processing circuitry is further configured to: in response to an anomaly in the timestamp data corresponding to a current interval in the synchronization operation, reset parameters of the second model.

15. The computing device of claim 11, wherein the second model comprises a state model corresponding to a Kalman Filter analysis of parameters of the first model, and
wherein to compute the corrected skewness estimate and the corrected offset estimate based on the second model, the processing circuitry is further configured to predict parameters of the state model based on a clock correction term, the predicted parameters comprising a predicted skewness estimate and a predicted offset estimate, and update the parameters of the state model based on the predicted parameters, a Kalman gain, and an innovation term, the innovation term comprising a residual between measurement data and the predicted parameters.

16. The computing device of claim 15, wherein to update the parameters of the state model, the processing circuitry is further configured to: based on at least one of a measurement error or a processing error, update at least one covariance matrix configured to represent an uncertainty of the regression model; and determine the Kalman gain estimate based on the covariance matrix configured to represent an uncertainty of the regression model.

17. The computing device of claim 15, wherein to update the parameters of the state model, the processing circuitry is further configured to:
detect the anomaly in the state model in accordance with:

$$|\eta_k| \geq \lambda \sigma_{xk}$$

where $\eta_k$ is a state error and $\eta_k = \hat{X}_k - \overline{X}_k$, $\hat{X}_k$ is the state model at $k^{th}$ interval, $\overline{X}_k$ is a moving average of the state model at $k^{th}$ interval, $\lambda$ is a scaler variable, and $\sigma^2$ is a variance for the state model and $\sigma^2_{xk}$ is a diagonal term of $P_k = (I - K_k H_k) P_k^-$ where H is a measurement function, P is a state covariance matrix, $P_k^-$ is a prior state covariance matrix, K is a Kalman gain, and I is an identity matrix.

18. Non-transitory computer-readable media comprising executable instructions, that when executed by processing circuitry, cause a computing device to:
obtain timestamp data in accordance with a synchronization operation for a timing protocol, wherein the timestamp data describes one or more measured delays for a path between the computing device and a second computing device of the network;
compute a skewness estimate and an offset estimate from the timestamp data by executing a regression analysis, wherein the regression analysis is configured to train a first model to predict the offset estimate and the skewness estimate, the skewness estimate comprising a frequency difference between a first clock at the computing device and a second clock at the second computing device, the offset estimate comprising a clock time difference between the first clock and the second clock;
compute a corrected skewness estimate and a corrected offset estimate based on a second model having parameters based on the offset estimate and the skewness estimate; and
modify a current value of the at least one of the first clock or the second clock based on at least one of the corrected offset estimate or the corrected skewness estimate.

19. The non-transitory computer-readable media of claim 18, further comprising executable instructions, that when executed by the processing circuitry, cause the computing device to:
in response to an anomaly in the timestamp data corresponding to a current interval in the synchronization operation, reset parameters of the second model.

20. The non-transitory computer-readable media of claim 18, further comprising executable instructions, that when executed by the processing circuitry, cause the computing device to:
at each time interval in the synchronization operation, update parameters of the second model based upon timestamp data corresponding to the time interval and an estimation error associated with the offset estimate and the skewness estimate.

* * * * *